United States Patent [19]
Brown

[11] 3,961,002
[45] June 1, 1976

[54] METHOD OF BUILDING CONSTRUCTION USING SYNTHETIC FOAM MATERIAL

[76] Inventor: Clarence Eugene Brown, 211 Watson Blvd., Centerville, Ga. 31093

[22] Filed: Jan. 31, 1973

[21] Appl. No.: 328,379

Related U.S. Application Data

[63] Continuation of Ser. No. 90,988, Nov. 19, 1970, abandoned.

[52] U.S. Cl. ................................ 264/46.5; 52/309; 52/744; 264/46.6; 264/271
[51] Int. Cl.² ...................... B29D 7/04; E04B 5/32; E04B 1/16
[58] Field of Search ................. 264/45, 46, 33, 331; 52/69

[56] References Cited
UNITED STATES PATENTS

| | | | |
|---|---|---|---|
| 1,828,876 | 10/1931 | Rohn | 25/128 E X |
| 2,098,389 | 11/1937 | Hutchison | 25/128 E X |
| 2,593,465 | 4/1952 | Torneau | 25/131 X |
| 2,775,017 | 12/1956 | McDonough | 25/128 E X |
| 3,075,240 | 1/1963 | Casavina et al | 264/45 X |
| 3,277,219 | 10/1966 | Turner | 264/45 |
| 3,315,424 | 4/1967 | Smith | 264/45 X |
| 3,501,875 | 3/1970 | DeMailly | 52/69 |
| 3,518,331 | 6/1970 | Marin | 264/35 |
| 3,620,246 | 11/1971 | Shoquist | 52/79 X |
| 3,668,287 | 6/1972 | Mackie | 264/45 X |
| 3,676,536 | 7/1972 | Shelley | 264/33 |

OTHER PUBLICATIONS

Gillette — "Precast Boxes Stacked, etc.," Civil Engineering — ASCE, Mar. 1968.
Mobay Chemical Bulletin— "Rigid Urethane Foam", 1963, Mobay Chemical Co., Pittsburgh, Pa.

*Primary Examiner*—H.S. Cockeram
*Attorney, Agent, or Firm*—Newton, Hopkins & Ormsby

[57] ABSTRACT

Method and apparatus for building construction wherein the building is formed as an integral unit of synthetic material. A first form means is provided which defines cavity portions representative of a building construction, walls and ceiling portions including predetermined utility component openings, window and door openings. Utility components including electrical environmental control and plumbing are positioned within the cavity portions of the first form means adjacent the predetermined utility component openings. Door and window frame means are positioned within the first form means adjacent the window and door openings. An additional form means is added to the first form means for effecting a substantially enclosed cavity portion representative of a predesigned building. Means is provided for filling the enclosed cavity portions defined by the first form means and the additional form means with synthetic building material. After the enclosed form means have been filled with the synthetic building material, the material is allowed to set up sufficiently to assume the form of the enclosed cavity portions, after which the form means are removed to expose a building construction formed as an integral unit including upright walls and top portions having the utility components and window and door frames molded therein. The electrical and environmental control components are constructed as a preassembled packaged unit having a main control unit with input conduit means connected thereto and including a plurality of output conduits corresponding to the number of locations of output conduits required in the predesigned building. Means is provided for securing the utility components into position adjacent the openings provided in the form means and means is provided for securing the window and door frames in position in the form means prior to a forming operation.

1 Claim, 27 Drawing Figures

INVENTOR.
CLARENCE EUGENE BROWN
BY: Newton, Hopkins, & Ormsby
ATTORNEYS

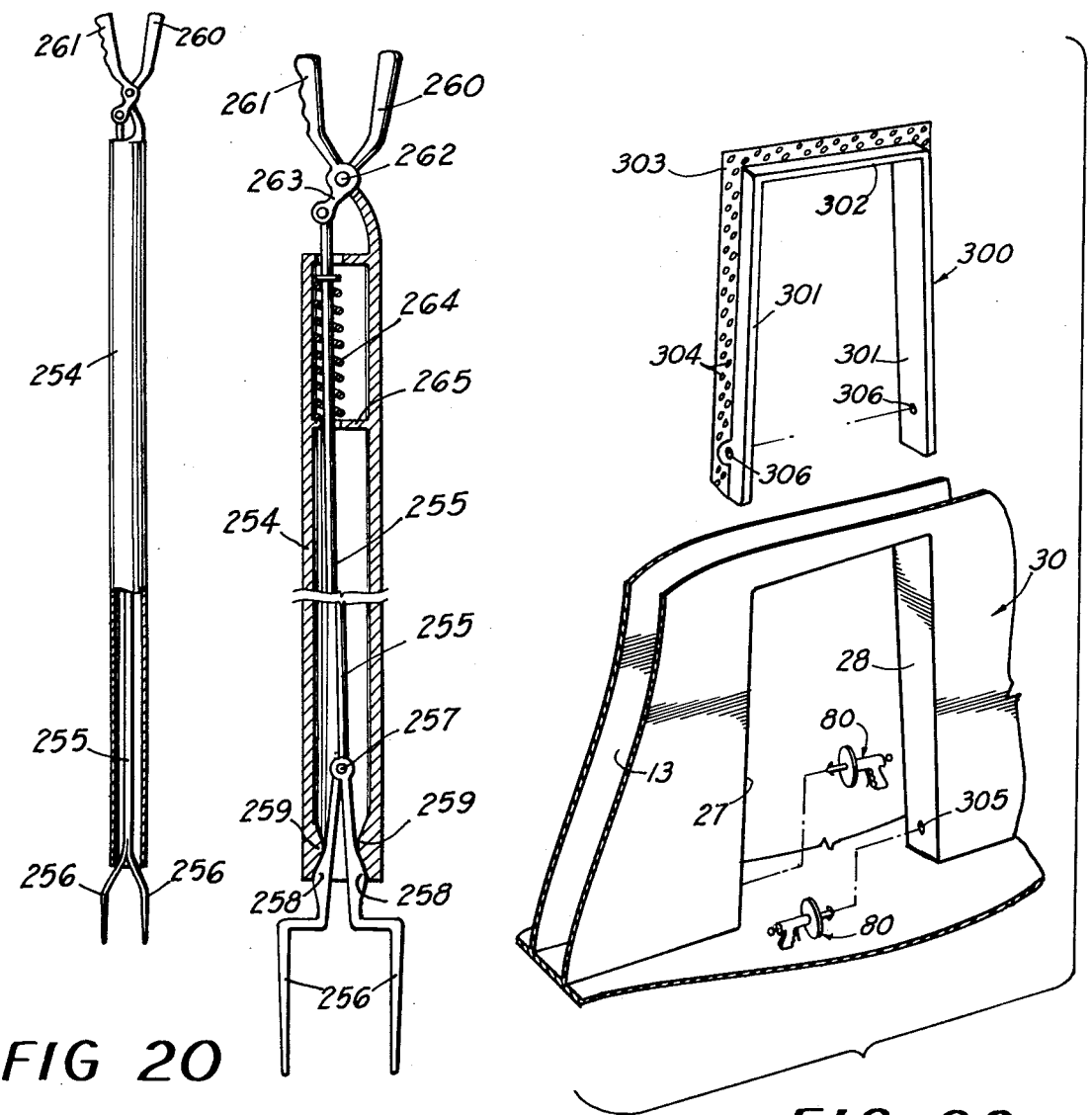
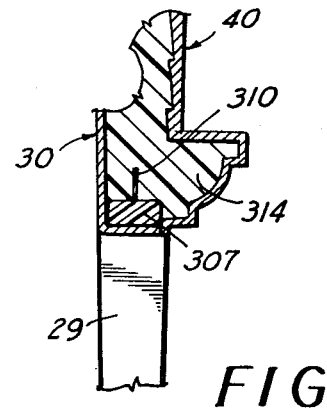
FIG 20  FIG 21  FIG 22
FIG 24

METHOD OF BUILDING CONSTRUCTION USING SYNTHETIC FOAM MATERIAL

CROSS-REFERENCE TO RELATED APPLICATION

This is a continuation of application Ser. No. 90,998, filed Nov. 19, 1970, now abandoned.

BACKGROUND OF THE INVENTION

This invention relates to a building construction which is molded as an integral unit of synthetic material. More particularly, this invention includes a molded building unit which includes the required utility components including electrical, environmental control and plumbing molded integrally within the wall structure of the building unit and further including the required window and door frames which are also integrally formed within the molded building unit.

A tremendous shortage of adequate homes exists today which will meet the needs of the expanding populous of people in the country. For this reason, there is a great need for a moderately priced home which would satisfy the requirements of the home industry. The construction of a home entirely on a building site is undesirable because of the many environmental factors which effect the rate at which these buildings can be constructed and because of the high cost of labor. To overcome these disadvantages of on-the-site building construction, there have been numerous attempts made to construct a desirable home within an enclosed factory utilizing an assembly line construction technique.

All of the prior art factory constructed buildings are formed of a plurality of sections which must be transported to a building site, these sections fastened together on a foundation and the joints of these sections sealed with a special sealing compound. Further, the utility components including environmental control and electrical facilities must be added to the building construction at the building site.

A number of concepts of building construction have been developed wherein the building is formed of synthetic building material. However, the prior art homes constructed of synthetic material are constructed of a number of sections which must be transported and assembled at the building site. All the prior art homes constructed of synthetic building material consist of a radical design which will facilitate the construction of the homes. However, these radical designs do not remotely resemble a home construction which is attractive and compatible with present day home designs and would distract from a community in which these homes are placed. Further, the prior art homes constructed of synthetic building material do not permit the building designs to be easily changed to employ varying architectural design characteristics.

Another disadvantage of a factory constructed home, which includes a plurality of sections, is the amount of assembly or erection time required for assembling the home after the home is delivered to the building site. Most of the prior art factory erected homes are undesirable because of a shortage of storage space and also because of the cramped and confined areas of the kitchen and bathroom areas.

Due to changes in environmental conditions, it is often desired and sometimes necessary that a building construction be relocated from one building site to another building site. In the prior art building construction, both where the building is completely constructed on the site and where the building is constructed of sections which were transported and assembled on the site, relocation of these are very difficult or sometimes even impossible.

SUMMARY OF THE INVENTION

It is therefore a primary object of this invention to provide a method of constructing a building formed as an integral unit of synthetic material including electrical, environmental control and plumbing components.

Another object of this invention is to provide a building construction which is formed as an integral building unit including electrical, environmental control and plumbing components.

A further object of this invention is to provide a building construction formed as an integral unit of synthetic material which is attractive in design.

A still further object of this invention is to provide a building construction formed as an integral unit of synthetic material which will satisfy various restricted building codes.

Still another object of this invention is to provide a building construction formed as an integral unit of synthetic material which is easily transportable from one location to another location.

Another object of this invention is to provide a building construction formed as an integral unit of synthetic material which resembles a building constructed of either masonary or wood material.

A further object of this invention is to provide a building construction formed as an integral unit of synthetic material which is completely fireproof in construction.

Still another object of this invention is to provide a building construction formed as an integral unit of synthetic material which includes the environmental control components located within the wall and ceiling portion of the building construction.

A still further object of this invention is to provide a factory for constructing a building formed as an integral unit of synthetic material.

A further object of this invention is to provide a preassembled, electrical component for use in a building construction.

Another object of this invention is to provide a preassembled, environmental control component for use in a building construction.

A still further object of this invention is to provide a window frame means for use in a building construction formed as an integral unit of synthetic material.

Still another object of this invention is to provide a door frame means for use in a building construction formed as an integral unit of synthetic material.

Another object of this invention is to provide a construction device for use in securing utility components including electrical, environmental control and plumbing at a predetermined location in a building construction.

A further object of this invention is to provide a construction device for securing the window and door frame means in a predetermined location in a building construction.

A still further object of this invention is to provide form means for use in constructing a building formed as an integral unit of synthetic material.

A further object of this invention is to provide an electrical control component for use in a building construction.

A still further object of this invention is to provide a method of handling form means for use in a building construction.

An additional object of this invention is to provide a method of building construction which is simple, economical to manufacture and reliable in operation.

These and other objects and advantages in the details of construction will become apparent upon reading the accompanying description of the illustrative embodiments of the invention with reference to the attached drawings wherein like reference characters have been used to refer to like parts throughout the several figures, and wherein:

BRIEF DESCRIPTION OF THE DRAWINGS

FIG. 20 is an elevational view of a tool for use in positioning components within the form means, with certain parts broken away and shown in section for purpose of clarity;

FIG. 21 is an enlarged sectional view taken along lines 21—21 of FIG. 20.

FIG. 22 is an exploded perspective view of an interior door frame means for use in the building construction;

FIG. 24 is a vertical sectional view taken through an assembled mold and exterior door frame structure;

DESCRIPTION OF THE ILLUSTRATIVE EMBODIMENTS

Figure 1:
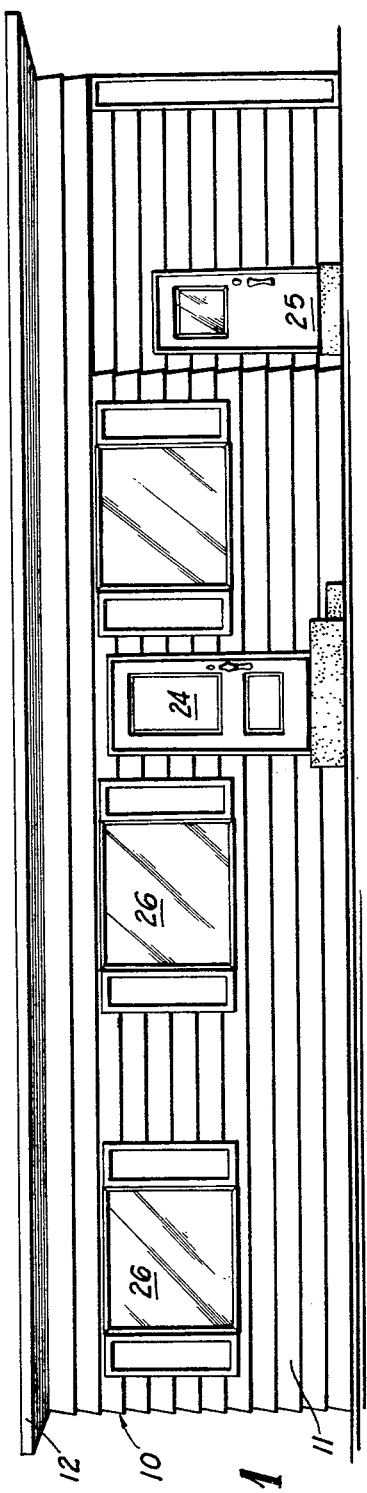
FIG. 1 is a front elevational view of a building utilizing the method and apparatus of the present invention.

Referring now to the drawings, the method and apparatus for building construction of the present invention will be described with reference to a building structure 10 shown in FIGS. 1 and 2; a mold structure and apparatus therefor 30, 40, etc. shown in FIGS. 3–13; utility components, including environmental control and electrical 200, 220 as shown in FIGS. 14–19; and window and door frame means 300, 310, etc., as shown in FIGS. 22–25.

Figure 2:
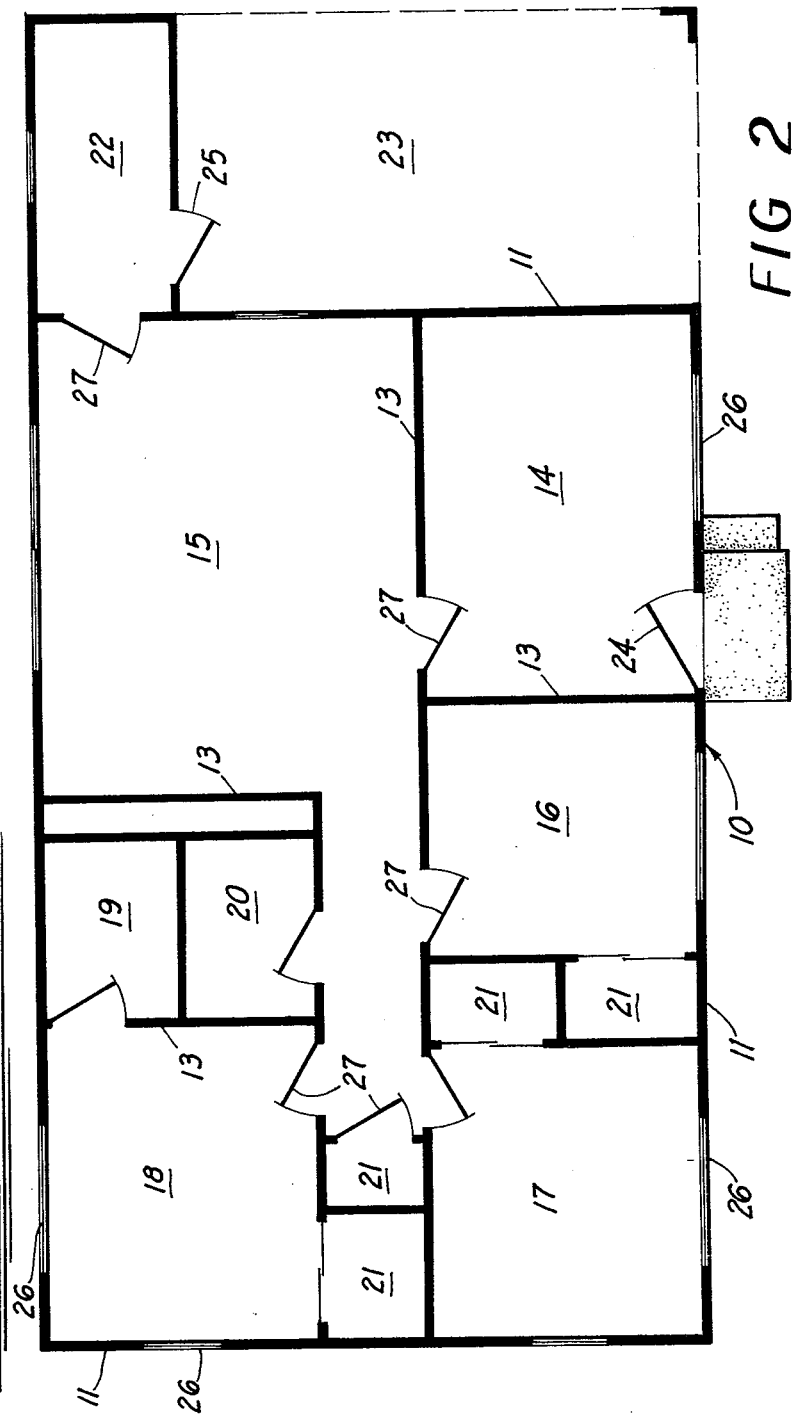
FIG. 2 is a horizontal plan view of the building construction shown in FIG. 1.

Referring now particularly to FIGS. 1 and 2, the illustrative embodiment of the building structure is in the form of a conventional home design and is indicated generally with the reference numberal 10. The building structure includes exterior walls 11 shown herein to have an appearance of a wood or aluminum siding and appearance of a conventional roof structure 12. The building structure 10 is provided with a number of interior walls 13 for dividing the building into a living room structure 14, a kitchen and den 15, three bedrooms 16–18, two bathrooms 19, 20, closets 21, utility and storage room 22 and a carport 23. Building 10 is provided with a front entrance 24 and a side entrance 25 opening into carport 23. As shown in FIGS. 1 and 2, building 10 includes a number of conventional windows 26 and a number of conventional interior doors 27.

The building construction 10 could take the form of a number of various designs. Even though the building design shown herein is provided with an exterior wall structure giving the appearance of a wood or aluminum siding, the exterior wall could be formed to have any appearance as desired, such as bricks or stone design. The illustrative embodiments shows a conventional home structure 10; however, the building structure could be any form of a cottage, church, service station, warehouse, mobile home, hospital, motel, apartment, shopping center, studio and for use in multi-storied building construction.

The building structure of the present invention is to be formed of a synthetic material, such as polyurethene foam, which is fireproof and capable of providing the desired strength and design characteristics that would assure a completely reliable and efficient building structure.

The material used in the building construction is of a weight characteristic to provide a building construction which is sufficiently light in weight, as would allow the building structure to be delivered to a building site with the use of airlift helicopter means.

One principle of this invention is to separate the floor foundation from the wall and ceilings and to mold the wall and ceiling structure of a predesigned building into an integral unit with the utility components including electrical, enviromental control, and plumbing and the window and door frames molded integrally therewith.

The floor and foundation can be constructed at the building site or can be constructed in a factory and delivered to the building site. The details of the floor and foundation forms no part of the present invention and will not be described in detail herein.

Figure 3:
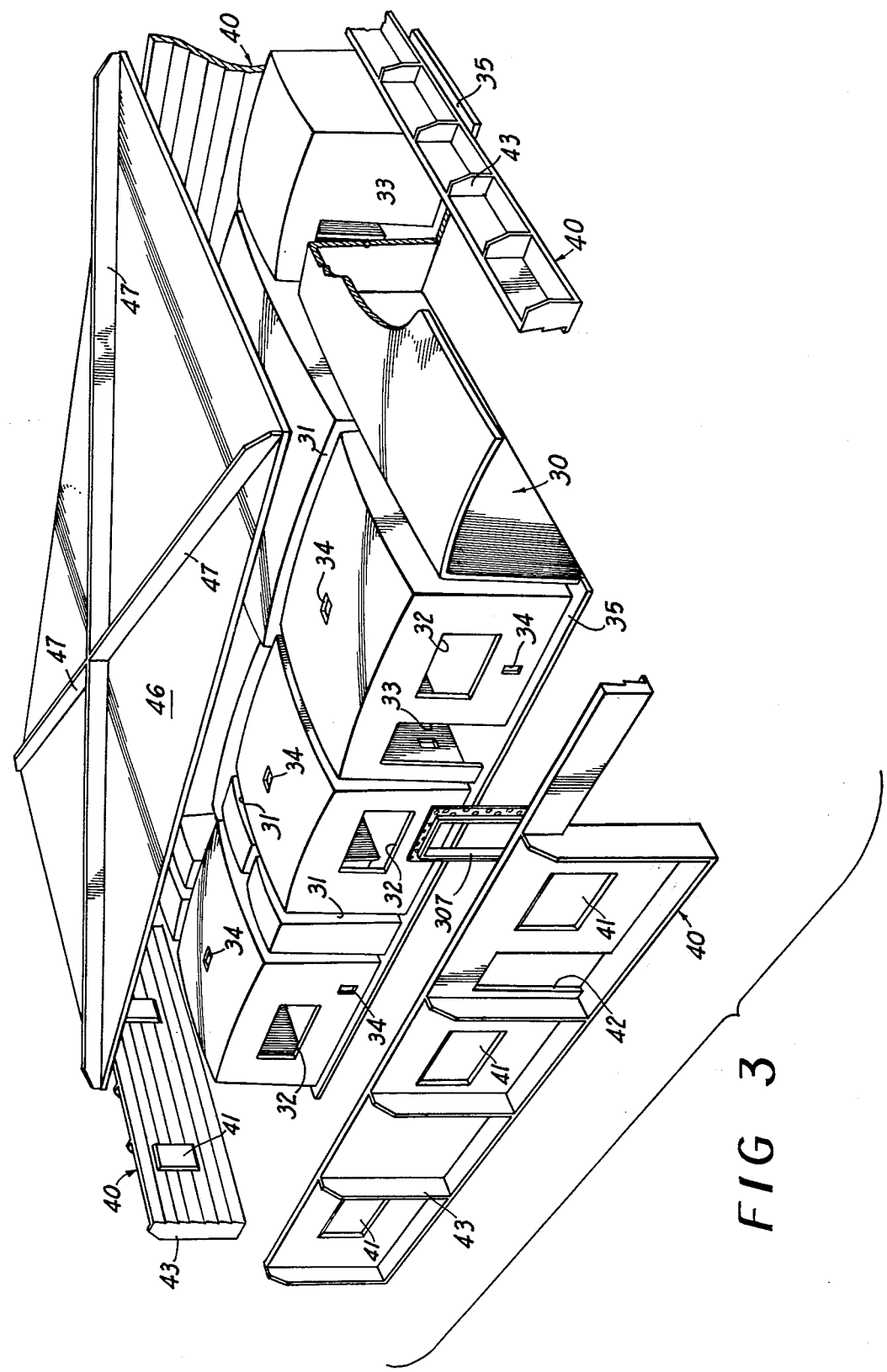
FIG. 3 is an exploded perspective view of the mold structure used in forming the building of FIGS. 1 and 2, with certain parts broken away and shown in section for purpose of clarity.

Referring now to FIGS. 3–7, the mold structure for use in forming a building construction according to the present invention includes an interior mold unit 30. The interior mold unit 30 includes a number of interior room units which are designed to represent the interior portion of a room. The room units are separated by interior cavity portions which will provide cavity portions 31 for the interior walls 13 of the predesigned building structure. As shown in FIG. 3, the interior mold structure includes a number of window openings 32 and a number of door openings 33, provided therein according to the predesigned building structure. A predetermined number of utility component openings 34 are provided in the interior mold structure for receiving predesigned utility component means, as will be described in more detail herein below. A horizontal lip structure 35 is provided adjacent the lower edge of the interior mold structure. The lip 35 extends laterally in a horizontal direction from the interior mold structure a distance sufficient to provide proper spacing of the interior mold structure with the exterior wall mold structure and to provide the bottom for the exterior wall cavity portions.

A number of exterior mold structures 40 are provided for operative assembled relationship relative to the interior mold structure to form a cavity portion which will represent the exterior walls 11. The number of exterior wall mold structures 40 will vary depending upon the predesigned building structure. As shown in FIG. 3, the exterior mold 40 includes a number of window openings 41 and a number of door openings 42. Elements 43 are provided on the exterior mold structure for reinforcing as required to prevent any bow in the mold structure in the forming operation.

The interior and wall mold structures are completely enclosed by a roof mold structure 46 formed to represent the desired design of the roof building structure. A plurality of elements 47 are provided on the roof structure for reinforcing the same as required in a forming operation.

Figure 4:
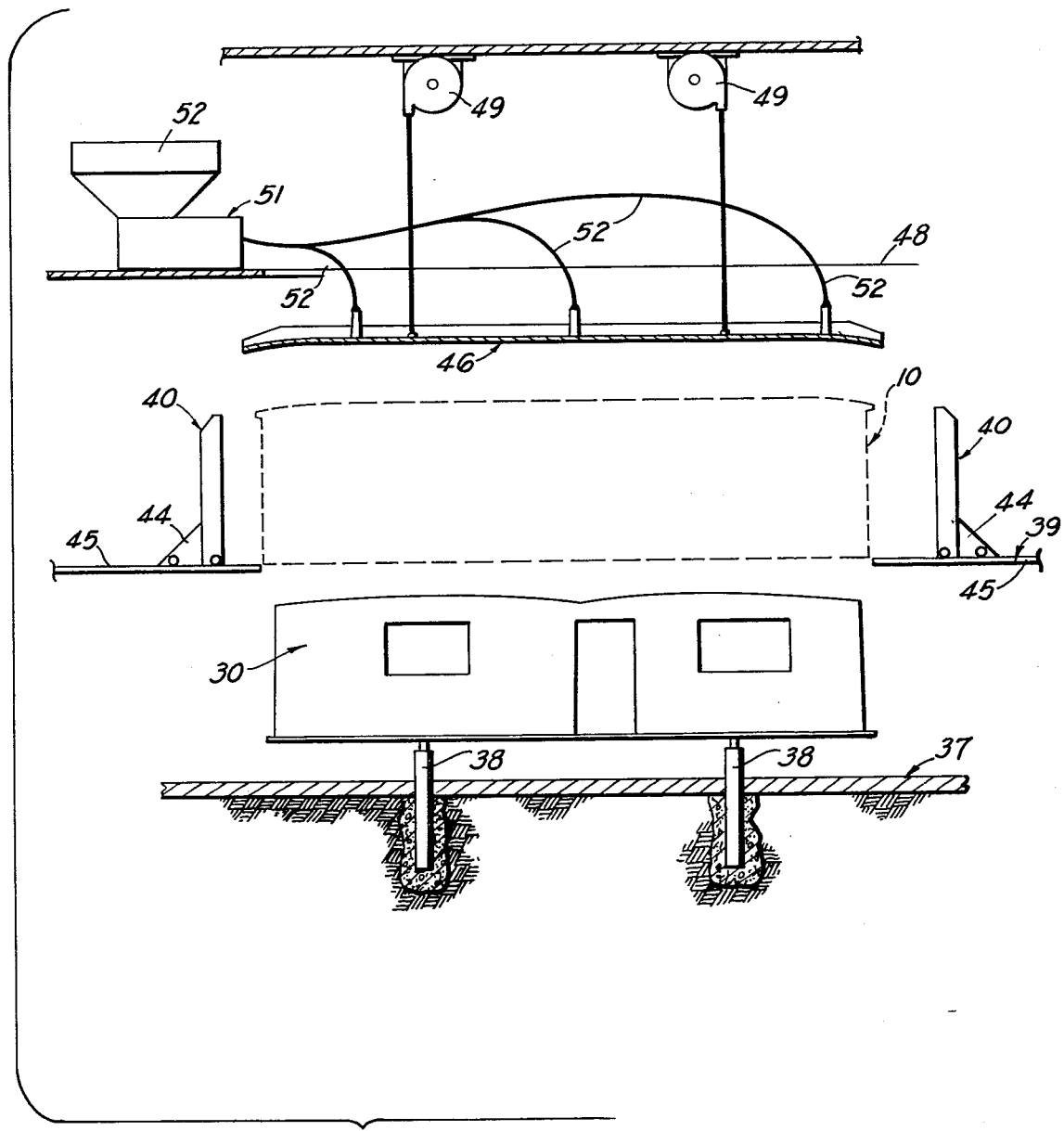
FIG. 4 is an elevational schematic view of a factory used for constructing a building according to the present invention.
Figure 5:
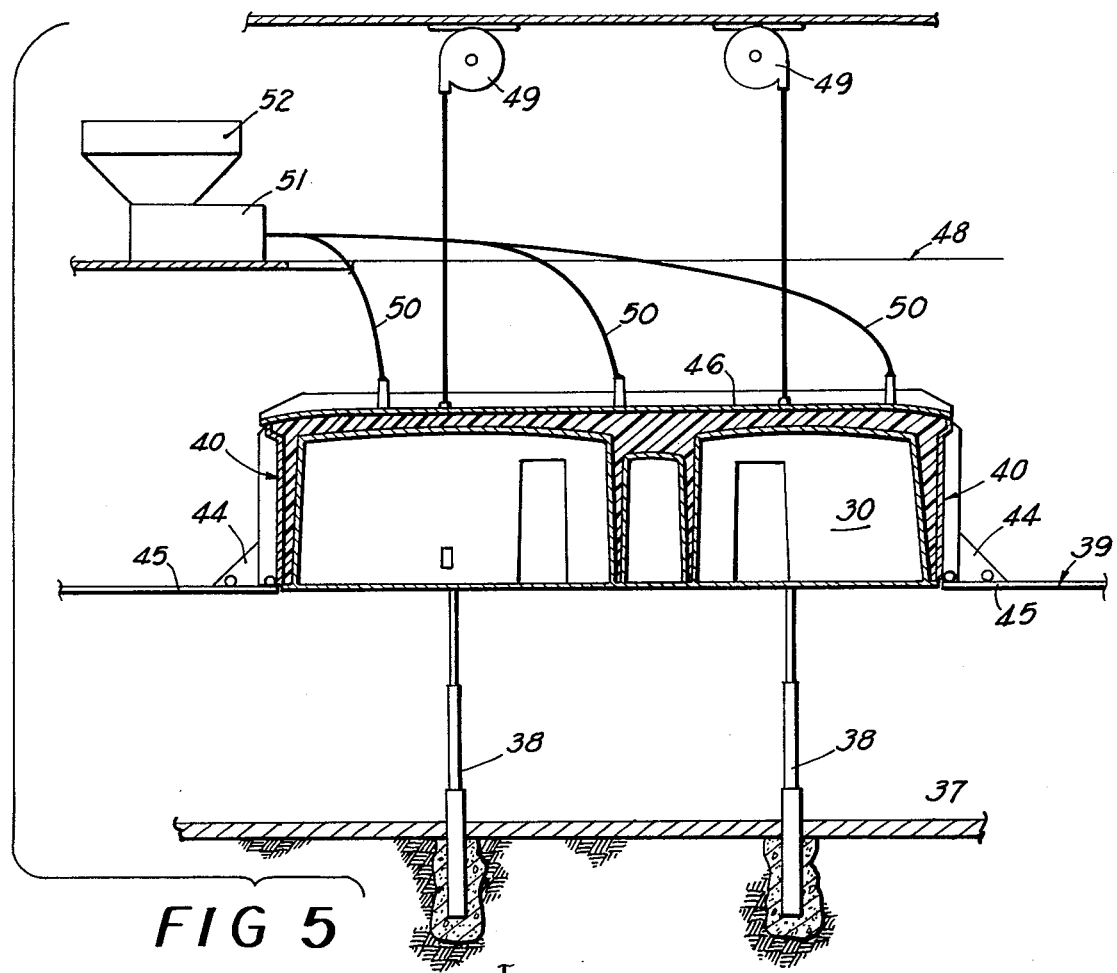
FIG. 5 is an elevational schematic view, similar to FIG. 4, showing the mold structure secured in place.
Figure 6:
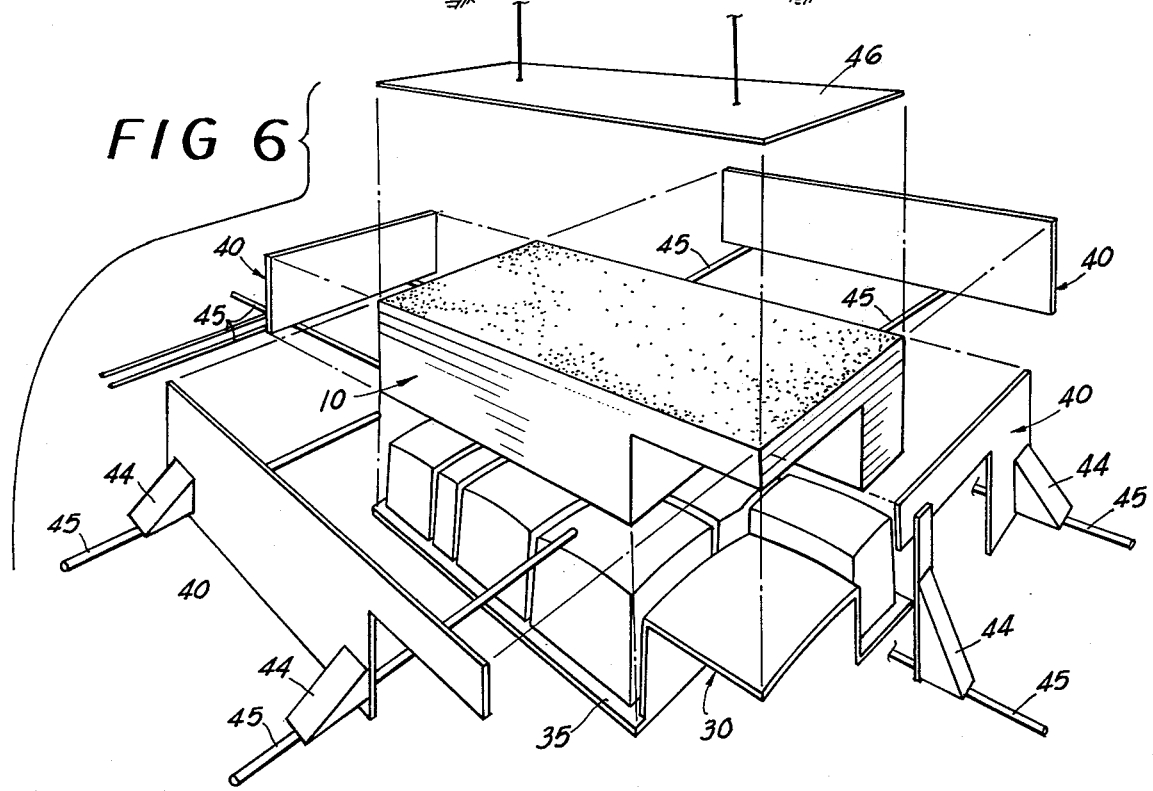
FIG. 6 is an exploded schematic perspective view of the mold and building structure.
Figure 7:
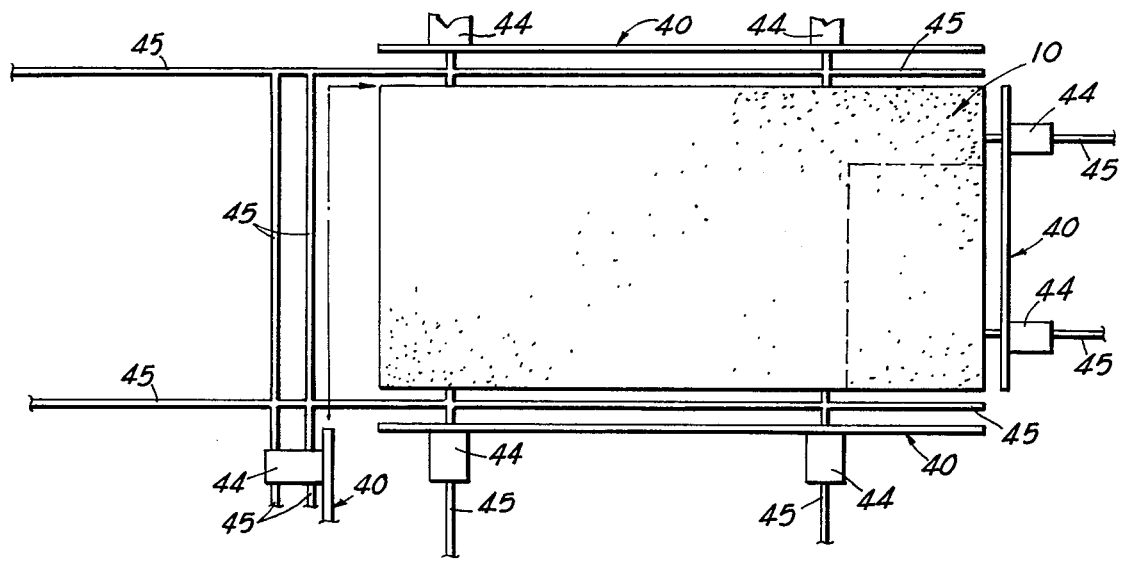
FIG. 7 is a horizontal schematic plan view of the mold and building structure.

Referring now particularly to FIGS. 4 and 5, a schematic illustration of a factory is shown in which the mold structures are housed and in which the forming operation of the predesigned building is effected. The building factory includes a first elevation 37 on which the predesigned interior mold structure 30 is stored. The interior mold structure 30 is moved from the first elevation 37 upwardly to a desired position at a second elevation 39 by a plurality of hydraulic jack means 38. Located on the second elevation 39 are the exterior wall mold structures 40. The exterior mold wall structures 40 are supported on a conventional dolly means 44 and are moved into position for a molding operation on a conventional rail transport means 45. The roof mold 46 is positioned at a third elevation 48 and is lowered into a predetermined position adjacent the interior mold 30 and wall mold structures 40 by means of a conventional hoist apparatus 49. The interior molds 30, exterior wall molds 40 and roof molds 46 are secured in an assembled relationship to define an enclosed cavity portion representative of a predesigned building, including upright walls and roof structures, by means of a series of clamp assemblies 60 which will be described in more detail herein below.

As shown in FIGS. 4 and 5, a series of conduit means 50 are mounted on the roof mold structure 44 and are in flow communication with the interior cavity portions of the assembled mold. A conventional pressure pump means 51 is provided for delivering a quantity of synthetic material from the reservoir means 52 to the enclosed mold structure for filling the cavity of the molds with the required amount of synthetic materials which will assume the form of the predesigned building construction.

The above described factory building technique can be utilized to construct a number of different building designs. The various elevations described herein above will be used to house their respective mold structure of the various building designs and will be moved into place for molding operation as required.

Figure 8:
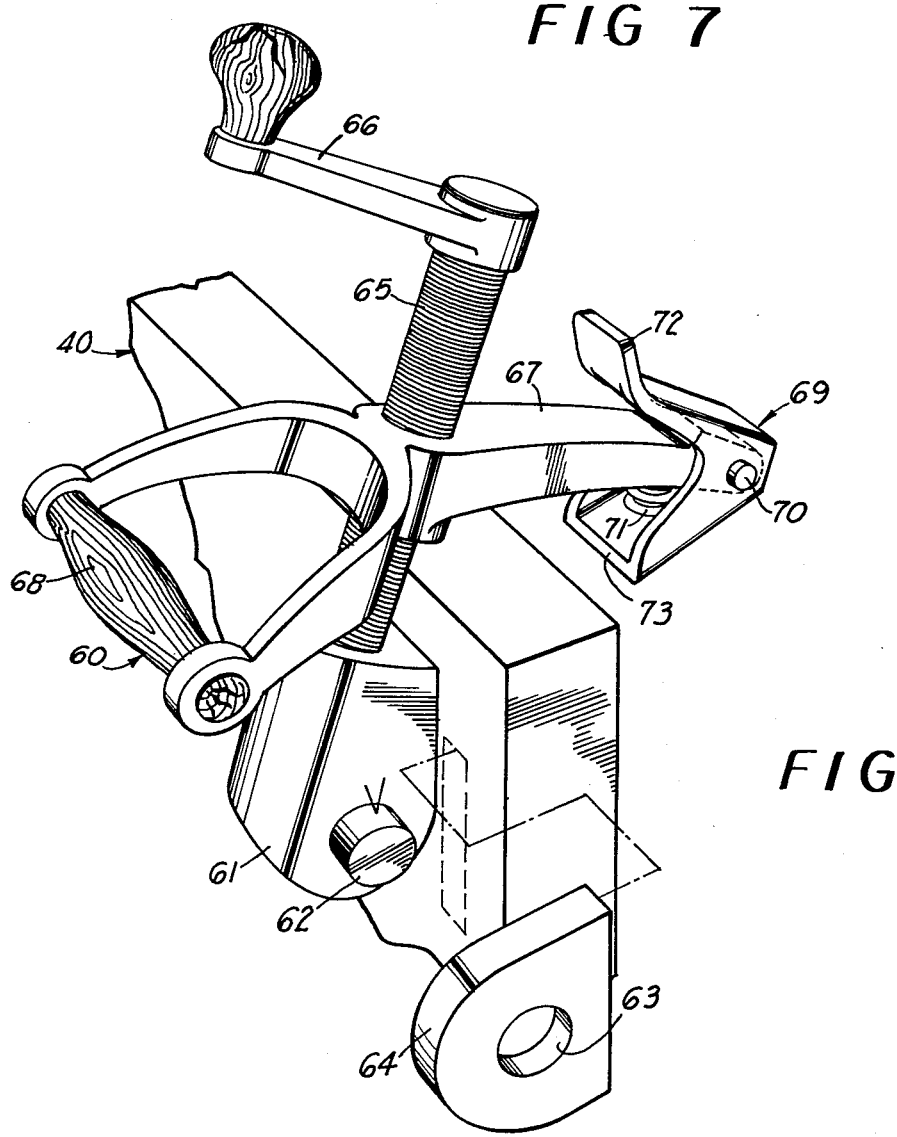
FIG. 8 is a perspective view of a clamp assembly for use in securing adjacent mold structure in an assembled relationship.
Figures 12, 13:
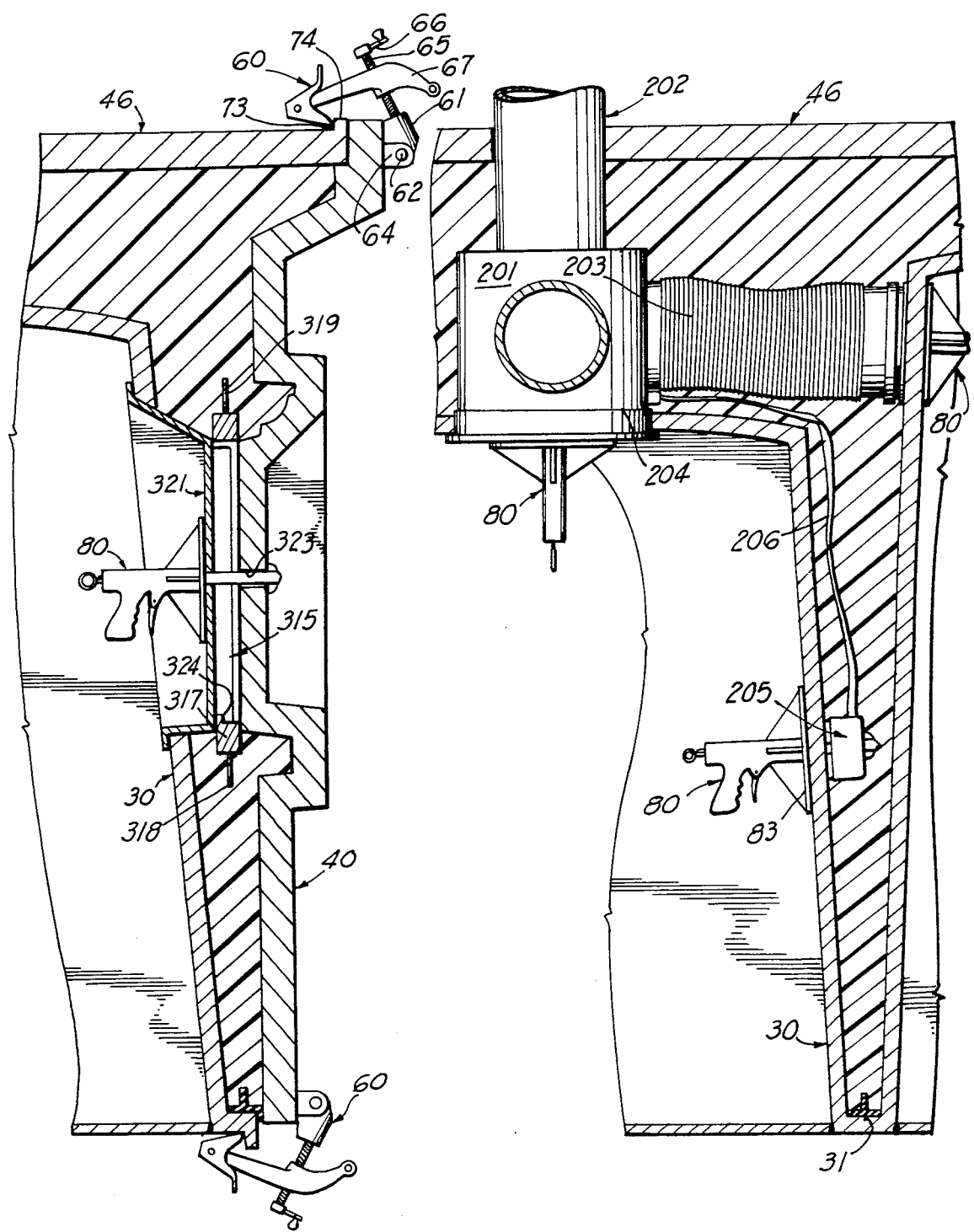
FIG. 12 is an enlarged fragmentary vertical sectional view taken through the building structure showing the molds secured in place with the clamp assembly and showing a utility component and window frame means secured in place with the gun assembly.
FIG. 13 is an enlarged vertical sectional view taken through the building structure showing an environmental control package secured in place within the mold structure.

Referring now particularly to FIGS. 8 and 12, the clamp assembly 60 used in securing the mold structures in an assembled relationship includes a collar 61 having a pair of projecting studs 62 which are pivotally received within complementary openings 63 formed in support bracket means 64. Brackets 64 are provided on the mold structures at various predetermined locations to support the number of clamp assemblies, as required to completely secure adjacent interior mold 30, exterior molds 40 and roof mold structure 46 in an assembled relationship for a molding operation.

Collar 61 includes a threaded opening for receiving a complementary threaded adjusting rod 65. Rod 65 is provided with a handle means 66 for adjusting the rod within the threaded opening of collar 61. An arm 67 is provided with an opening complementary to threaded adjusting rod 65 and is threadably received thereon for adjustment to a desired clamping position. Arm 67 includes a handle 68 which is effective for manipulating the clamping assembly to a desired clamping position and is also utilized to help position the mold structures in a precise location relative to an adjacent mold structure.

An extended end of arm 67 is provided with a releasable clamp element 69. Clamp element 69 is pivoted at 70 on an extended end of arm 67 and is spring urged in a counterclockwise direction, as shown in FIG. 8, by compression spring 71. An upturned handle element 72 is provided for rotating the clamping element 69 clockwise about pivot 70 to release the clamp from a clamped position. Clamping element 69 includes a locking dog 73 detailed to releasably engage a lip portion 74 formed on an adjacent mold structure, as shown in FIG. 12. The clamp assemblies can be located on either of the mold structures and are provided at a predetermined number of locations, as would be required to secure the mold structures in a completely assembled and sealed relationship as described above.

Figure 9:
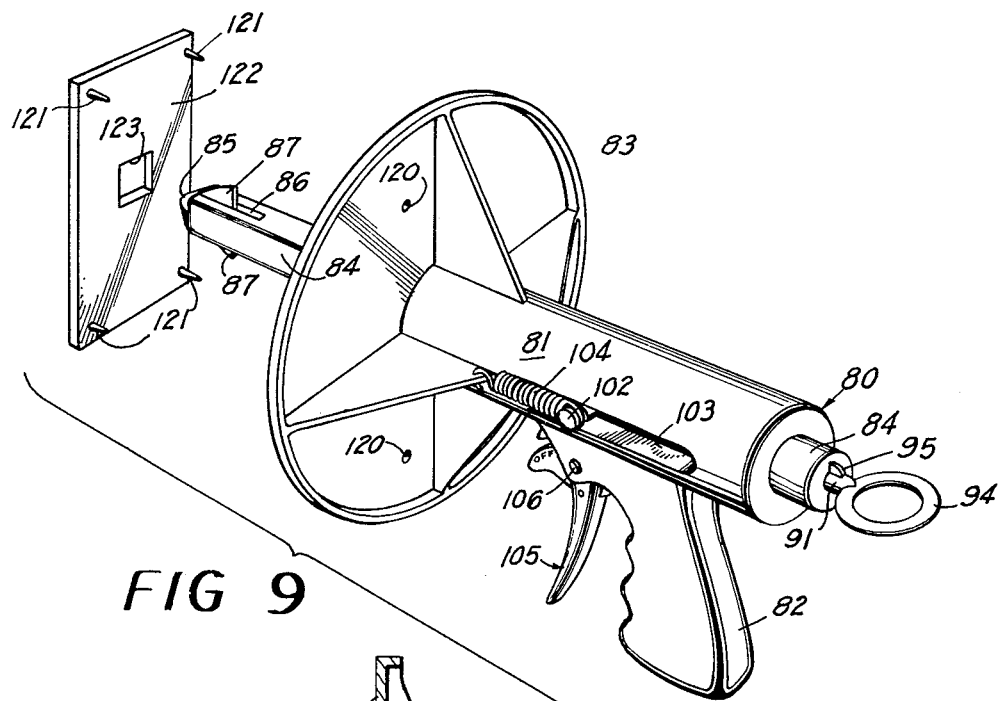
FIG. 9 is a perspective view of a gun assembly used for securing the utility components and window and door frames in a predetermined location in the mold structure.
Figure 10:
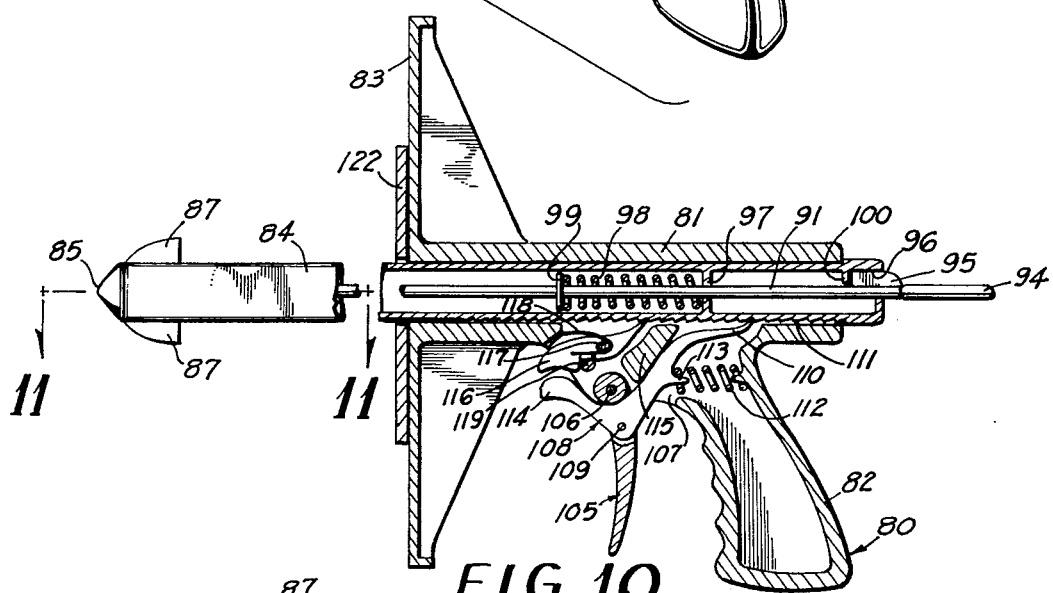
FIG. 10 is a vertical sectional view taken along lines 10—10 of FIG. 9.

Referring now particularly to FIGS. 9–12, a gun locking mechanism 80 is illustrated which is provided for securing the various utility component outlet boxes, various environmental control outlet boxes, and the window and door frame means in their predetermined positions within the mold structure for a molding operation. As shown in FIGS. 9 and 10, the gun mechanism 80 includes an elongated cylinder body portion 81 and a pistol handle grip portion 82. Secured to a left end of cylinder body 81 is an abutment plate element 83. Movably supported within the interior bore of cylinder 81 is an operable plunger means 84. A left extended end of plunger 84 is provided with a pointed end 85. A pair of oppositely directed and aligned slots 86 is provided within plunger 81 for movably supporting a pair of latch elements 87.

An outer operative end of latch elements 87 includes a rounded camming surface 88 and a latching surface 89. The purpose of the camming and latching surface 88, 89 will be described in more detail herein below. Latching elements 87 are pivoted at 90 to an actuating rod 91. A camming surface portion 92 is formed on each of the latching elements 87 intermediate pivot 90 and latching surface 89. Camming surfaces 92 are detailed for cooperating with internal formed camming surface 93 provided on the interior of cylinder 81. Camming surfaces 92, 93 are provided for effecting a movement of latching elements 87 from a projected latching position to a retracted unlatched position, as shown in dotted lines of FIG. 11.

A right extended end of actuating rod 91 extends through plunger 84 and terminates in a circular engaging end 94. Formed on the actuating rod 91 adjacent circular end 94 is a radially projecting retaining element 95. Element 95 is slidably received within a complementary notch portion 96 formed in the end of plunger 84. The purpose of the notch and retaining element will be described in more detail herein below.

Figure 11:
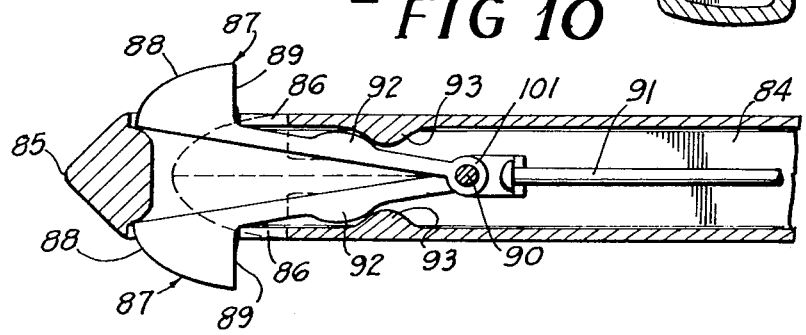
FIG. 11 is an enlarged sectional view taken along lines 11—11 of FIG. 10.

An interior portion of plunger 84 is provided with a wall structure 97. A compression spring 98 is provided around the actuating rod 91 between the wall structure 97 and a retaining clip 99 which is fixed to the actuating rod 91. Compression spring 98 will operate to spring bias the actuating rod 91 and latching element 87 to the left, as shown in FIGS. 9–11. In a leftward limit position of actuating rod 91, the retaining element 95 will be in abutting relationship with a stop element 100 formed on interior portion of plunger 84.

With the retaining element 95 in abutting relationship with stop element 100, latching elements 87 will be in an outwardly projecting position as shown in FIG. 11. Elements 87 are moved from an inwardly retracted position to the outwardly projecting position as the actuating rod 91 is forced to the left by compression spring 98. A leftward movement of actuating rod and latching element 87 will allow a torsion spring element 101 to force the latching elements 87 outwardly to their projected latching position. A rightward movement of actuating rod 91 will move the latching elements rightward causing the camming surfaces 92 to cooperate with camming surfaces 93 to retract latching elements 98 to an inward position, as shown in FIG. 11.

After latching elements 87 have been moved to their inward retracted position, rotation of the actuating rod 91 to angularly displace the retaining element 95 relative to the notch 96 will serve to hold the latching elements in their retracted position. The end of retaining element 95 will cooperate with the annular surface surrounding the actuating rod 91 and prevent a leftward movement of actuating rod 91.

As shown in FIGS. 9 and 10, the operable plunger element 84 is movably supported within cylinder 81. Plunger 84 is provided with a stud element 102 which projects outwardly through an elongated slot 103 formed within cylinder housing 81. A tension spring 104 is provided between an extended end of stud 102 and a reinforced element on the backing plate 83. Tension spring 104 will spring urge the plunger leftward until the stud 102 contacts a leftward edge of the elongated slot 103.

Movement of the plunger 84 rightward against the action of tension spring 104 is effected by means of an operable trigger mechanism 105. Trigger 105 is pivotally supported at 106 within a slot 107 formed at the juncture of the pistol handle 82 and cylinder body 81. A ratchet element 108 is pivotally attached at 109 to the trigger 105. Ratchet 108 includes an extended operable ratchet end 110 which is in engagement with a series of ratchet teeth 111 formed on the outer surface of plunger 84.

A compression spring 112 is located within the pistol housing and in biasing engagement with a formed lug portion 113 provided on ratchet 108. Spring 112 urges ratchet 108 counterclockwise about pivot 109 such that the operable end 110 would be in spring biased engagement with the ratchet teeth 111. A left outwardly extended end 114 of ratchet 108 is provided for pivoting the ratchet 108 clockwise about pivot 109 to disengage the operable ratchet end from teeth 111. A stop 115 is provided within the housing to serve as a counterclockwise limit of rotation of the ratchet 108 about pivot 109.

In operation, a counterclockwise pivotally movement of trigger 105 about pivot 106 will force the ratchet 108 to the right causing the plunger 84 to move rightward therewith.

As shown in FIG. 10, a pivoted latch dog 116 is provided within the cylinder housing 81 for holding the plunger 84 in a rightward advanced position. Latch dog 116 is pivoted at 117 and includes a spring element 118 for spring urging the dog 116 into engagement with the ratchet teeth 111. The latch dog 116 will serve to hold plunger 84 in a set position during a clockwise movement of the trigger 105.

A clockwise movement of trigger 105 will allow the ratchet operable end 110 to cam over the surface of ratchet teeth 111. A second counterclockwise pivotal movement of trigger 105 will cause the ratchet 108 to advance plunger 84 a distance to the right corresponding to the number of ratchet teeth over which the ratchet end has been allowed to move leftward. During a rightward movement of the plunger 84, the latch dog element 116 will cam over the ratchet teeth 111. Spring 118 will urge the dog into a locking relationship with each ratchet tooth as the teeth are moved to the right. A counterclockwise limit position of the dog 116 is provided by a stop element 119 formed within the housing 81. Latch dog 116 includes an outwardly extended end which is in abutting relationship with the left operable end 114 of ratchet 108. A clockwise movement of the ratchet 108 by the operable end 114 will also serve to effect a clockwise movement of the latching dog 116, to thereby release the plunger 84 for sliding movement with the cylinder 81.

As shown in FIGS. 9 and 10, the backing plate 83 is provided with a series of openings 120 which are detailed to receive a plurality of complementary projections 121 provided on an insert plate 122. Insert plate 122 is provided with an opening 123 complementary to the outer surface of plunger 84. The insert plate 122, shown in FIGS. 9 and 10, is detailed to be received within a utility component opening such as a control outlet receptacle or an overhead receptacle box. Insert plate 122 is easily removed from plunger 84. Additional insert plates (not shown) which are complementary to predesigned openings in the form means are provided for positioning the utility components in a desired set position. The operational relationship of the gun assembly relative to the utility component for use in positioning window and door frames will be described in more detail herein below in the operation.

Figure 14:
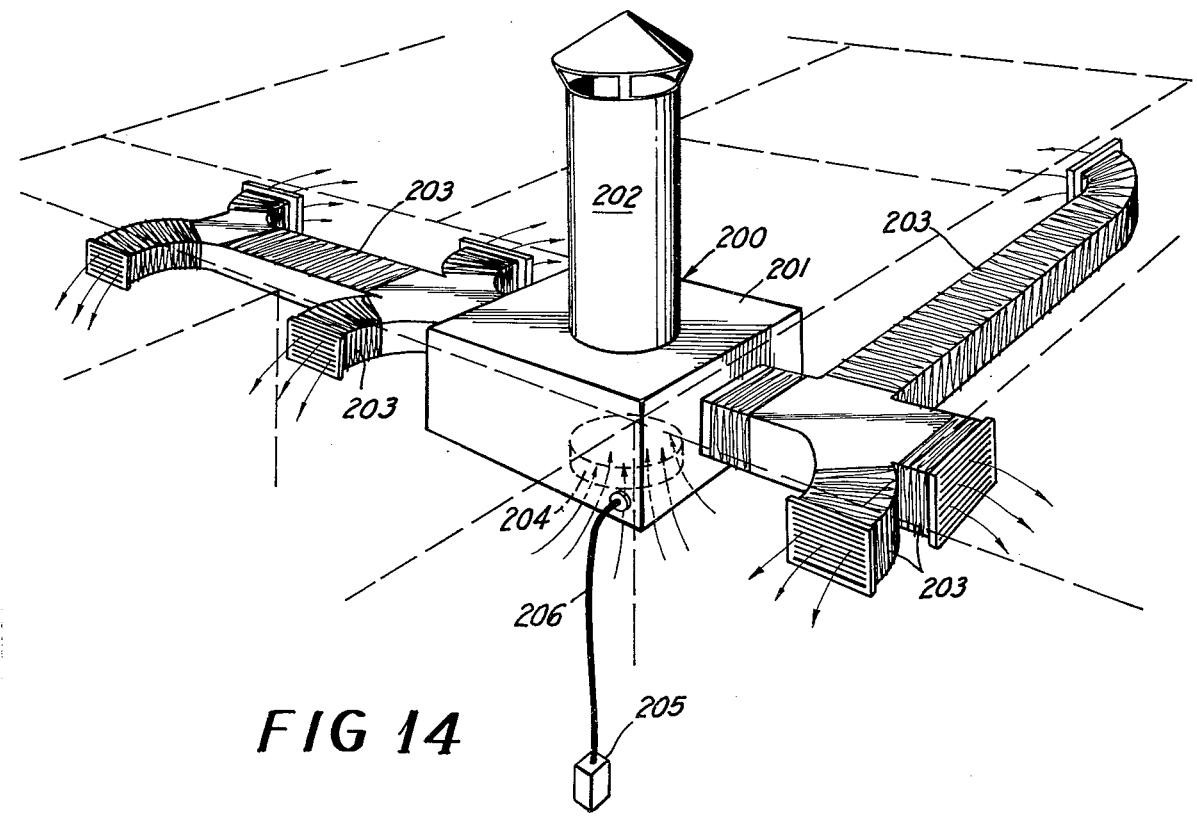
FIG. 14 is a perspective view of a preassembled environmental control package for use in the building construction.

Referring now particularly to FIGS. 13 – 21, the utility components including electrical and environmental control are shown for use in the building construction of the present invention. As shown in FIG. 14, one embodiment of an environmental control component includes a preassembled environmental control package 200 having a conventional combination heating and air conditioning unit means 201. An exterior conduit means 202 is in flow communication with the combination unit 201 and includes outlet means fr communication with an exterior portion of the building construction. Conduit means 202 is used to furnish fresh air to the heating and cooling unit or for exhausting air from within the interior of the building construction.

A plurality of supply conduits 203 are connecting in flow communication with the heating and cooling unit 201. The number of supply conduits 203 will vary depending on the design of the building construction. One supply conduit is normally provided for each room of a building construction. However, a number of supply conduits for each room can be provided in the preassembled package if required.

An intake conduit 204 is provided in the bottom of the heating and cooling unit 201. Intake conduit 204 is provided for effecting circulation of air withinn the building. As shown in FIG. 14, the air will flow from the supply conduit 203 through the area of the room and will return through the intake conduit 204. If the predesigned building construction is sufficiently large, a number of intake conduits could be connected with the intake conduit 204 and provided in flow communication with each room to insure adequate circulation as required.

The combination heating and cooling unit 201 is provided with a thermostat control receptacle 205. Control receptacle 205 is provided with electrical supply conduits 206 detailed for allowing the thermostat receptacle to be located at a predetermined location within the cavity portions of the building mold construction. Thermostat control receptacle 205 is of conventional construction detailed for receiving a conventional thermostat control means for effecting start and stop operation of the combination heating and cooling unit 201.

Figure 15:
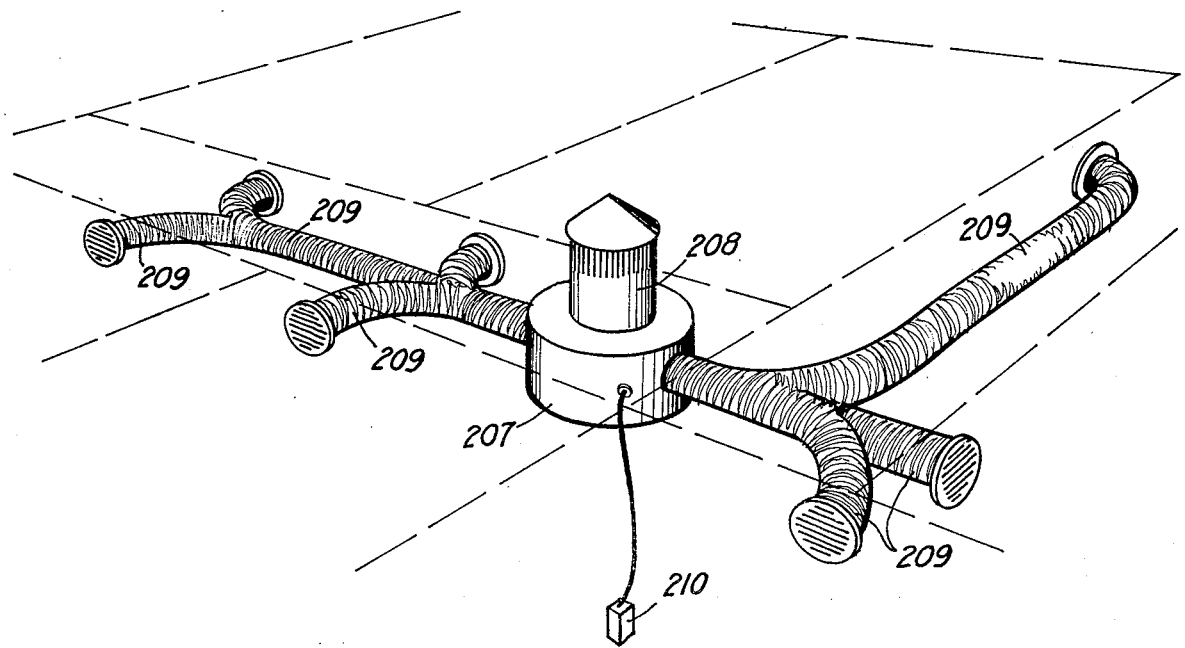
FIG. 15 is a perspective view of a modified form of a preassembled environmental control package.

As shown in FIG. 15, a modified form of the preassembled environmental control package is provided. The preassembled environmental control package of FIG. 15 includes a combination heating and cooling unit 207 with an exterior exhaust conduit means 208 connected in flow communication therewith. A number of supply conduits 209 are connected in flow communication with heating and cooling unit 207. Supply conduits 209 are detailed for flow communication with each of the room areas of the predesigned building construction. A thermostat control receptacle 210 is electrically connected with the heating and cooling unit 207 for providing an operable control therefor.

One important feature of the above described environmental control components of the present invention is that each of the environmental control components are constructed as a preassembled package detailed in design for a specific building construction. The preassembled environmental control package includes a number of supply conduits detailed for furnishing a supply of air to each of the room areas of the predesigned building. The number of supply conduits will vary as required by the predesigned building.

As shown in FIG. 14, the supply conduits 203 are substantially rectangular in cross section wherein the supply conduits 209 illustrated in the modification of FIG. 15 are substantially circular in cross section. The supply conduits of each of the embodiments of FIGS. 14 and 15 are constructed of a material which will allow the supply conduits 203, 209 to be stretched from a package transport position to an extended position adjacent a predetermined opening in the building room construction.

As shown in FIG. 13, the supply conduits 203, 209 are secured in place adjacent a predetermined opening in the mold construction by means of the gun assembly 80 described herein above. The above described gun assembly 80 is also used for securing the intake conduit 204 and thermostat control receptacle 205 adjacent a predesigned opening in the mold construction. Gun assembly 80 is provided with different insert plates 122. A respective insert plate 122 is complementary to the openings for the associated intake supply conduits 203, 209 and thermostat control receptacles 205, 210. The insert plates 122 are designed to completely fill the opening in the mold construction and will secure the respective units in a substantially rigid condition within the cavity portions of the mold for a molding operation.

Figure 16:
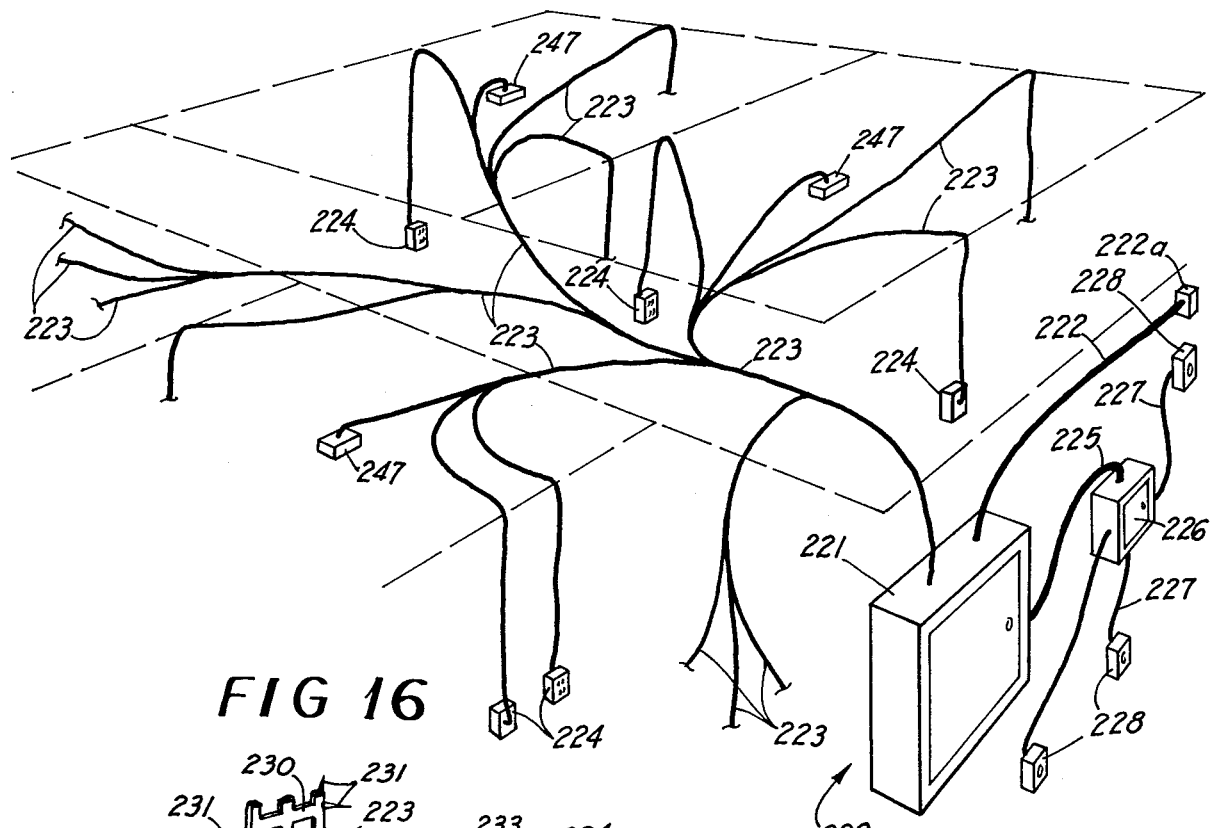
FIG. 16 is a perspective view of preassembled electrical control package for use in a building construction.

Referring now particularly to FIG. 16, a preassembled electrical control package 220 is provided for placement within the cavity portions of the mold construction 30, 40 described herein above. The preassembled electrical control package 220 includes a master control box 221. An input supply line 222 is connected in electrical communication with master control box 221 and is provided with an exterior receptacle means 222a. Receptacle 222a is detailed for connection with a power supply line at the building site for furnishing electrical power to the master control box 221. A plurality of supply and control lines 223 are provided in electrical communication with master control box 221 and extend therefrom to each of the rooms of the predesigned building construction. A number of wall and overhead receptacles 224, 247, respectively, are provided on the extended end of the supply lines 223. The number of supply lines 223 and receptacles 224, 247 will vary depending on the number of rooms and the electrical design of the building construction.

As shown in FIG. 16, a secondary control box 226 is electrically connected with master control box 221 by a supply line 225. The supply line 225 is detailed for providing a 220 volt input into the secondary control box. The secondary control box is for use in the kitchen area of the house for delivering power to the units requiring 220 volts, such as electrical range, over, hot water heater and dishwasher. The secondary control box 226 includes a number of supply lines 227 terminating in receptacles 228. Certain of these supply lines 227 and receptacle 228 are detailed for furnishing a conventional 110 volt power requirement to the lights and plug-in receptacles in the kitchen area and certain of the receptacles 228 are detailed for furnishing a 220 volt requirement to the above mentioned kitchen units.

An important feature of the electrical control components are that the components are constructed in a factor as a preassembled package detailed in design to include the number of supply lines and control receptacles as required in the electrical design of the building construction. The preassembled package is delivered to the above described mold construction and the package is assembled in place in the cavity portions of the mold before the mold is filled with synthetic materials.

Figure 17:
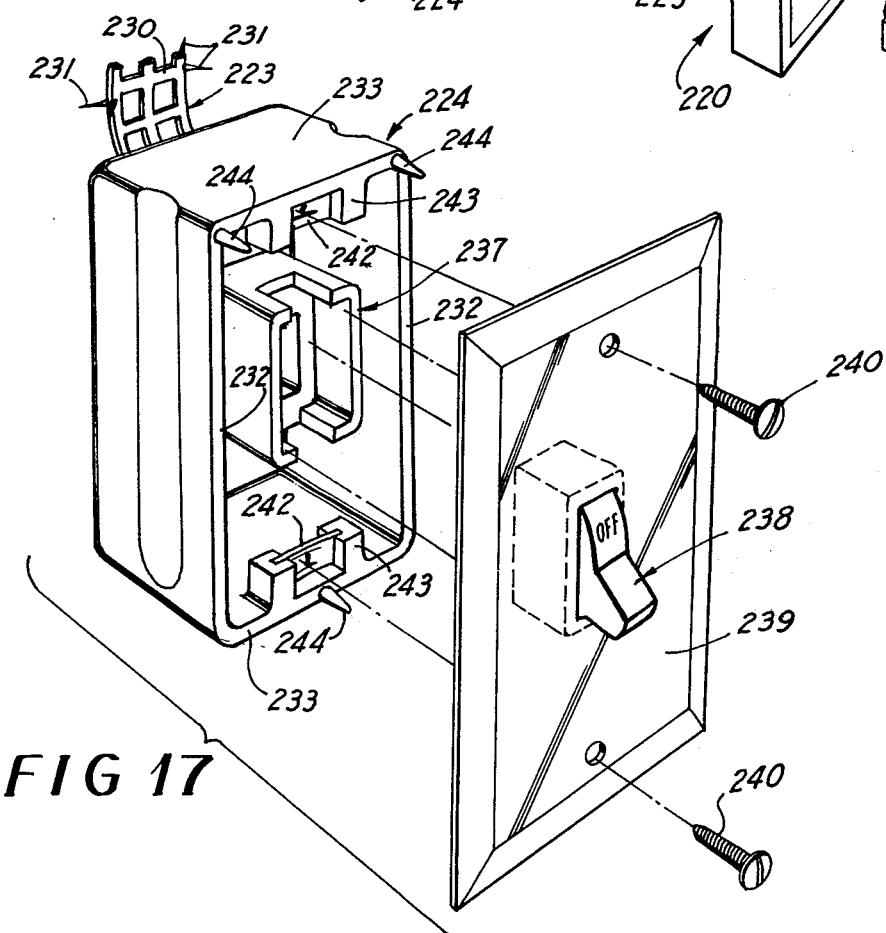
FIG. 17 is an exploded perspective view of an electrical receptacle and control means therefor.
Figures 17A, 18:
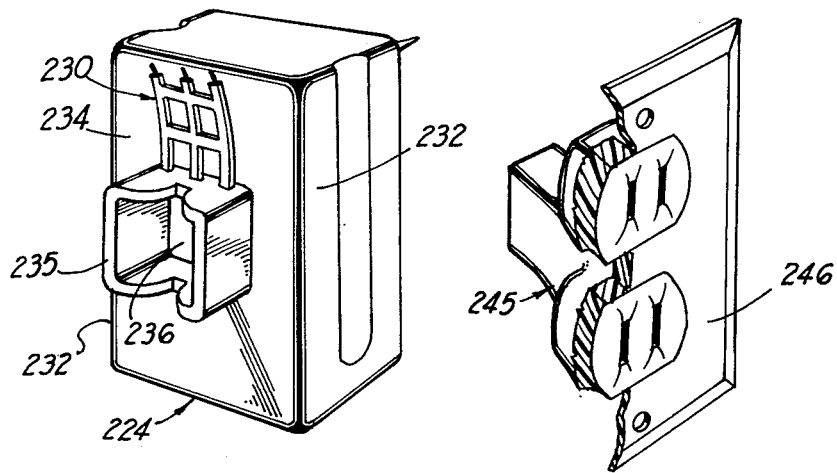
FIG. 17a is a fragmentary perspective view as seen from the rear of FIG. 17.
FIG. 18 is a perspective view of an alternate control means for use in the receptacle of FIG. 19.

As shown in FIG. 17, the supply lines communicating between the receptacles 224, 247 and the master control box are of a three wire ribbon-like construction 230. Ribbons 230 are provided with a number of integrally formed tabs 231. Tabs 231 are detailed for spacing the ribbon a predetermined distance from the surface portions of the mold. The spacing of the ribbons from the surface portion of the mold will insure that the supply conduits 223 are not exposed in any area of the wall or ceiling portions after the molds have been removed therefrom.

Each of the wall receptacles 224 is constructed as an outwardly open reservoir means, including a pair of side walls 232, a pair of end walls 233 and a back wall 234. An integrally formed shaped retainer element 235 is provided on the back wall 234 for receiving the latching surfaces 89 of gun assembly 80, described herein above. The shape retainer 235 includes an opening 236 complementary to the shape of the gun assembly plunger 84. The interior of the receptacle 224 is provided with a plug-in socket 237. The plug-in socket 237 includes a formed open area for receiving either a complementary switch control unit 238 or an outlet supply means 245. Opening 236 extends through the shaped retainer 235, back wall 234 and into the interior of the plug-in socket 237, whereby the gun plunger 84 can be inserted therethrough to maintain the receptacle 224 in a secured position on the mold construction. The plug-in socket 237 is provided with conventional electrical contact means which will be in electrical communication with complementary contact means on either the switch unit 238 or supply means 245 whereby switch unit 238 and supply means 245 will be in operable relationship with the ribbon supply line 223 leading to the respective receptacles 224. Switch 238 is maintained in position within the plug-in receptacle 237 by means of a cover plate 239. Cover plate 239 is provided with a pair of openings for receiving complementary screw means 240. Screws 240 are detailed to be inserted in a pair of retainer clips 242. Clips 242 are secured on end walls 233 by means of shoulder elements 243.

As shown in FIG. 17, the receptacle 224 is provided with a series of projecting spacer elements 244. Spacers 244 are provided for maintaining the receptacle 224 a slight distance spaced inwardly from the surface of the mold, as shown in FIG. 12. The slight inward spacing of the receptacle 224 will allow the mold structure 30 to be easily removed from the walls of the building construction after the building material has been allowed to set-up, without the molds contacting or becoming engaged with any projecting edges of the receptacles 224.

As indicated above, the plug-in socket 237 formed in wall receptacles 224 is detailed to either electrically receive and connect a switching unit 238 or an outlet supply unit 245. The outlet supply unit 245 is provided with electrical contact means which will be electrically connected with the contacts of the plug-in socket 237, when inserted therein. The outlet supply unit 245 is provided with a cover plate 246 for securing the supply unit in an assembled relationship. Cover 246 is held in place by means of screws 240, as described herein above.

Figure 19:
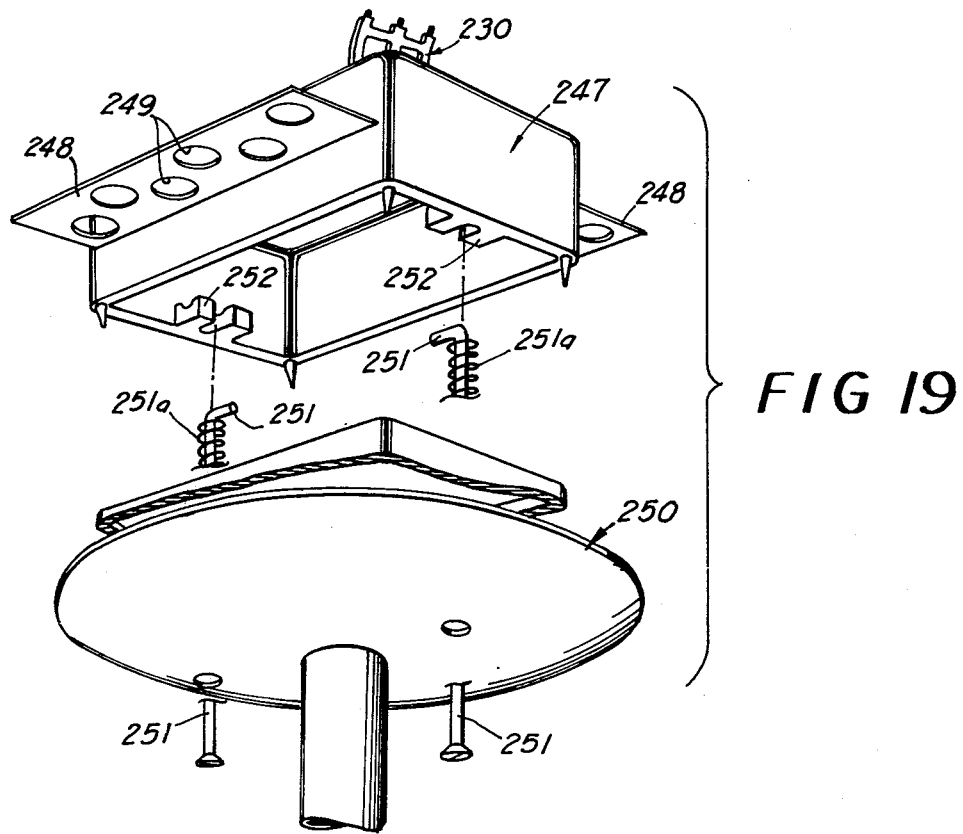
FIG. 19 is an exploded perspective view of another electrical control receptacle and component therefor.

As shown in FIG. 19, an overhead receptacle 247 includes a downwardly open reservoir means similar in design and including a plug-in socket 237 as illustrated in wall receptacle 224. Therefore, the details of the interior area of the overhead receptacle 247 will not be described and reference is made to the above indicated details of the wall receptacle 224. One difference in the overhead receptacle 247 and the wall receptacle 224 is that the overhead receptacle is provided with flange means 248 extending outwardly therefrom. Flanges 248 are provided with a series of openings 249. Flanges 248 with openings 249 are detailed for providing an anchor means which extend within the synthetic material of a building construction ceiling. The flanges 248 are detailed in design to provide the amount of strength to retain and effectively support the overhead receptacle in the building construction ceiling portions whereby the overhead receptacles 247 will support a light fixture means 250.

Light fixture means 250 is provided with a plug-in electrical contact means similar to the plug-in means of the control switch 238, whereby the light fixture 250 will be electrically connected with the supply line 223. A light fixture 250 is secured in place within the overhead receptacle 247 by means of a pair of hook element means 251 detailed for releasable connection with shoulder elements 252 formed on the overhead receptacle means 247. Hook elements 251 are inserted through complementary openings in the light fixture 250 and are rotatable to allow a hooked end to be selectively moved to a holding position above the shoulder elements 252. Each of the hook elements 251 is provided with spring means 251a for spring urging the hook elements into a holding position on the shoulder portions 252. The light fixture 250 is easily removed from the overhead receptacle by merely rotating the hook elements 90° to allow the hook engaging ends to be disengaged from the shoulders 252.

Referring now particularly to FIGS. 20 and 21, a placement tool 253 is provided for positioning an electrical receptacle 224 adjacent a predesigned opening in the mold construction whereby an operator can insert the gun assembly plunger 84 through the opening 36.

Placement tool 253 includes an elongated tubular member 254 having an actuating rod 255 moveably supported therein. A lower end of actuating rod 255 is provided with a pair of gripper members 256. Grippers 256 are pivoted at 257 to actuating rod 255. Each of the gripper elements 256 are provided with projecting camming surfaces 258 detailed to cooperate with inwardly projecting camming surface 259 formed on the interior of the tubular member 254, adjacent a lower end thereof. The operation of the gripper elements 256 by the camming surfaces 258, 259 will be described in more detail herein below. An upper extended end of the tubular member 254 is provided with fixed extension handle 260. A movable actuating handle 261 is pivoted to the fixed extension handle 260 at 262. Pivoted actuating handle 261 is connected by a link 263 to an upper end of the actuating rod 255. A compression spring 264 is provided around the upper end of the actuating rod 255, between link 263 and an inwardly projecting wall construction 265 formed within the tubular member 254. The compression spring 264 is operable to spring urge the actuating rod upwardly. Movement of the actuating rod 255 upwardly will cause the gripper members 256 to be cammed inwardly to a gripping position by the action of the camming surface 258, 259.

Figure 26:
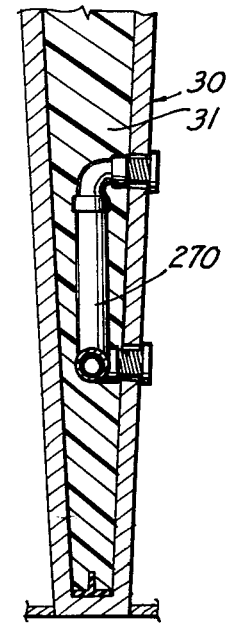
FIG. 26 is an enlarged vertical sectional view taken through the building and mold structure showing preasssembled plumbing components secured in place in the mold structure.

Referring now particularly to FIG. 26, a plumbing utility component 270 is provided with a mold construction wall cavity portion. The plumbing component is constructed as a preassembled package including the number of supply conduits and drainage conduits as required by the predesigned building. The plumbing component 270 is positioned within the cavity portions of the mold constructions in the area of the bathroom and kitchen construction and will provide a number of conduits leading into the interior of the bathroom and kitchen construction. The conduits leading into the interior of the room construction are located adjacent predesigned openings, not shown, provided in the mold construction. The plumbing utility components are secured in place within the mold cavity portion by conventional threaded connecting means 271.

An important feature of the present invention is that the plumbing construction is located within the formed walls of synthetic material. Therefore, the plumbing package is assembled in place in the cavity portion of the mold before the molds are filled with the required amounts of synthetic material. A removal of the mold construction will expose a number of plumbing supply openings and a number of drainage openings, as required by the predesigned building. The supply openings and drainage openings are connectible with conventional plumbing units, such as a water faucet or bath tub drainage means.

Referring now particularly to FIGS. 12 and 22–25, door and window frame means are illustrated for placement within the cavities of the molds adjacent predetermined openings for windows and doors, as required by the predesigned building construction. FIG. 22 illustrates an interior door frame means 300 adapted to be secured in position adjacent an interior opening 27 provided in the cavities representative of interior walls 13. An interior door frame means 300 is substantially inverted U-shape and includes two downwardly extending legs 301 and a cross-connecting frame member 302. Door frame means 300 includes a flange element 303 extending outwardly from legs 301 and cross member 302. Flange 303 is provided with a series of openings 304. Flange 303 will anchor the door frame 300 within the formed synthetic material.

The interior door frame means 303 is inserted from the top of the interior cavity portion 31 adjacent an interior door opening 27. The cavity portions representative of an interior door opening 27 are substantially enclosed by a connecting flange 28, except for an opening 305 located in flange 28 adjacent a bottom edge of the door opening. Openings 304 are detailed in location to be in alignment with openings 306 provided in the lower end of door frame legs 301. An interior door 300 is secured in position adjacent an interior door opening 27 by means of a pair of the gun assemblies 80 described herein above. In an assembled relationship, the gun assembly plunger 84 is inserted through opening 305 provided in the mold flange construction 28 and inserted through openings 306 provided in the door leg frame means 301 as will be described in more detail herein below in the operation technique of the building construction.

Figure 23:
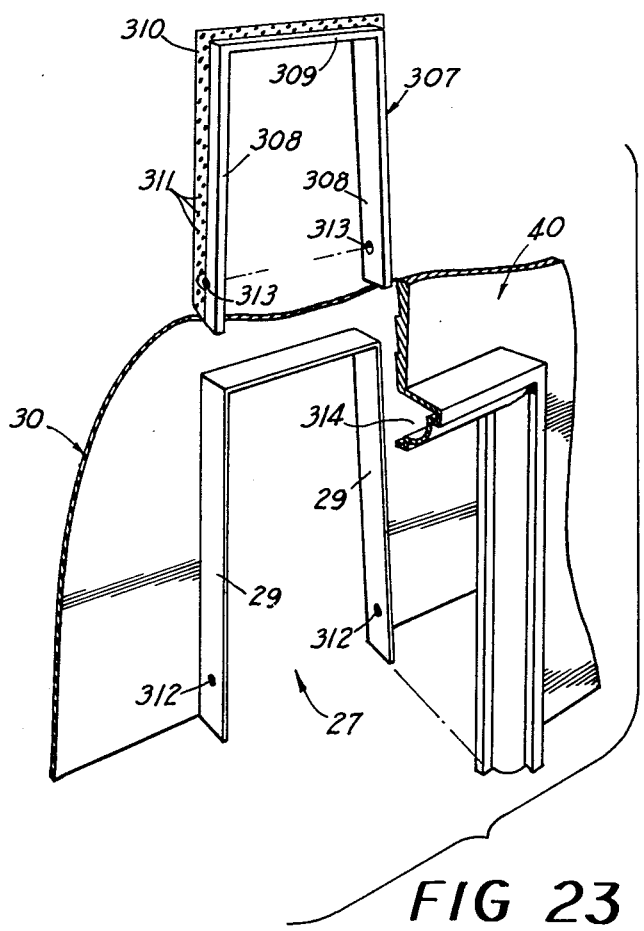
FIG. 23 is an exploded perspective view of the form means and an exterior door frame means for use in the building construction.

An exterior door frame means 307 is illustrated in FIG. 23. Exterior door 307 is adapted to be assembled within the mold construction adjacent exterior door openings 24, 25. The exterior door frame means 307 is an inverted U-shaped member having a pair of downwardly extending legs 308 and a cross-connecting frame member 309. An anchoring flange 310 is provided around an outer edge of the door frame legs and cross-connecting member. Flange 310 is provided with a series of openings 311 to improve the anchoring relationship of the flange and door frame means within the synthetic material. The exterior door frame means is secured in position adjacent the interior mold construction before the exterior wall mold construction is secured in place.

As shown in FIG. 23, the interior mold 30 includes an integrally formed flange element 29 detailed to represent the exterior door openings. The flange element 29 is provided with openings 312 adjacent a lower edge thereof. Openings 312 are detailed in location to be aligned with openings 313 provided in each of the door frame legs 308. Door frame means 307 is secured in an assembled relationship by the insertion of gun plunger 84 through each of the openings 312, 313 such that the latch elements 87 are firmly secured to the outer surface of exterior door frame means. After the exterior door frame means 307 has been assembled in position, the exterior mold 40 representative of an exterior wall design is moved into position and secured in place.

The exterior wall mold construction includes a shaped cavity portion 314 detailed in design to represent the configuration of a door face. The design of the cavity portion 314 will be varied as required by a predesigned building. In the assembled relationship as shown in FIG. 24, the exterior door frame means will be secured in place adjacent the exterior entrance openings 24, 25, in between the interior mold construction 30 and the exterior mold construction 40. The synthetic material introduced into the cavity portions will surround the outer surface of door frame means 307 including anchoring flange and will completely fill the predesigned door face cavity portion 314 surrounding the exterior door frame means.

Figure 25:
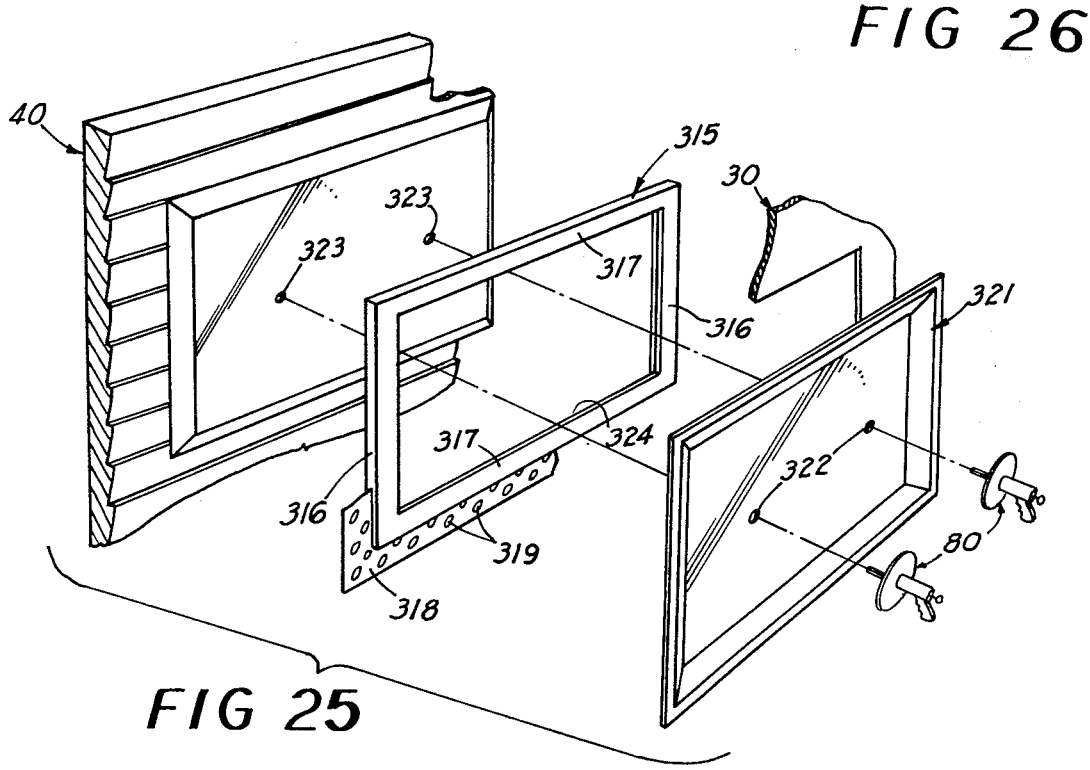
FIG. 25 is an exploded perspective view of the mold and window frame means.

Referring now particularly to FIGS. 12 and 25, a window frame means 315 is illustrated which is to be assembled in position in the mold construction wall cavity portions adjacent the predetermined window openings 26. The window frame means 315 disclosed includes a substantially rectangular frame element having a pair of vertically extending frame members 316 and a pair of horizontally extending frame members 317. Extending around the edges of the window frame means 316, 317 and extending outwardly therefrom is an anchoring flange 318 provided with a series of openings 319. The anchoring flange 318 is detailed to securely hold the window frame means 315 in position within the molded synthetic material, as described above in regard to the door frame means.

The exterior mold wall construction 40 is provided with a shaped design detailed to represent a predesigned window facing means. Window frame means 315 is secured in an assembled relationship relative to the shaped mold construction by means of a pair of gun assemblies 80. The gun assembly plunger portions 84 are inserted through complementary openings 322 provided in a retainer plate 321 and through aligned opening 323 provided in the exterior mold. The retainer plate 321 is complementary to a window entrance opening provided in the interior mold construction and detailed in design to represent the interior surface portion of a window design. In an assembled relationship the gun plungers 84 extends through openings 322, 323 a distance to allow plunger latches 87 to engage outer surfaces of the exterior mold. Operation of trigger 105 will withdraw plunger 84 to clamp the window frame between exterior mold 40 and retainer plate 321. The material will be supplied to the exterior wall cavity portions and will surround the outer surface of window frame means 315, as shown in FIG. 12, whereby the anchoring flange 318 will firmly secure the window frame means 315 into position within the molded exterior walls. The window frame means 315 includes an opening 324 provided for receiving a conventional window closure element, not shown.

The above described door frame means 300, 307, and window frame means 315 are constructed of a rigid material such as conventional metal or wood stock material. However, the window and door frame means could be constructed of any suitable material which would provide the rigid supporting requirements for supporting a door or window thereon. It is pointed out that the design of the mold construction around the windows and doors to represent a window and door facing can be changed as required by the predesigned building.

CONSTRUCTION OPERATION TECHNIQUE

In a building construction factory as illustrated in FIGS. 4 and 5, a number of interior molds 30 representative of various designs of building construction are housed on the first elevation 37, a number of exterior side mold constructions 40 representative of various exterior designs of a building are housed on the second elevation 39 and a number of roof mold structures 46 representative of a number of roof designs are housed on the third elevation 48.

To begin a building construction according to the present invention, an interior mold construction 30 representative of a predesigned building is moved into position over hydraulic jack means 38. The interior mold construction 30 supported on the first elevation 37 are moved into position over the hydraulic jack means 38 by conventional dolly and track means 44, 45 schematically illustrated in FIGS. 6 and 7.

After the interior mold construction 30 has been placed in a position over the hydraulic jacks 38, operation of the jacks are effected to move the interior mold construction upwardly to a position in alignment with the second elevation 39, as shown in FIG. 5. With the interior mold construction 30 in position on the second elevation, a base plate 130 is positioned on the interior mold horizontal lip structure 35. The base plate 130 is detailed to include a number of cross-connecting members 131 representative of the interior wall construction and a surrounding member 132 representative of the exterior wall construction. Base plate 130 includes an upwardly extending anchoring flange 133 having a series of openings formed therein. Anchoring flange 133 is provided for securely anchoring the base plate within the molded wall construction. As shown in FIG. 12, the exterior base member 132 includes a downwardly projecting flange 134 extending around the peripheral edge of the exterior walls. The downwardly projecting flange 134 is clamped firmly in position between the interior mold construction 30 and the exterior wall mold construction 40.

After the base plate 130 has been located in position on the interior mold construction 30, the above described preassembled electrical control package 200 is positioned on the interior mold construction 30. The master control box is positioned adjacent an opening, not shown, provided therefor at a predetermined location within the interior mold construction and is firmly secured in place relative to the opening. The supply lines 223 and wall and overhead receptacles 224, 247 respectively, are positioned adjacent their respective predetermined openings 34 provided in the interior mold wall construction. The receptacles are secured in position by placing an insert plate 122 complementary to the receptacle opening onto the plunger 84 of gun assembly 80. Plunger 84 is then inserted through the opening 236 provided in the receptacles with the gun assembly latching elements 87 extending outwardly in a latched position behind the shaped retainer 235. With the latch elements 87 in a latched position, the trigger mechanism 105 is operated to withdraw the plunger 84 outwardly thereby clamping the receptacle firmly in position adjacent an opening 34 in the mold construction wall.

If a receptacle 224 is to be located within one of the cavities 31 representative as an interior wall, the placement tool 253 is used to position the receptacle therein. With an operator located in a position above the interior cavities 31, the placement tool gripper elements 256 are secured to the outer surface of a receptacle 224. The receptacle 224 is moved into position by lowering the tubular rod 254 to position the receptacle adjacent a predetermined opening 34. A second operator within the interior of the mold 30 will attach the receptacle to the wall by placement of the gun assembly 80 as described herein above. After the receptacle has been secured in place within the interior cavities 31, the operator located above the interior cavities 31 will release the placement tool 253 by operation of the movable actuation handle 261 relative to fixed extension handle 260 to effect a downward movement of actuating rod 255 within the tubular support member 254. A downward movement of actuating rod 255 will move the grip member cam surfaces 258 downwardly away from the tubular member cam surface 259 and a torsion spring, not shown, located about pivot 268 will spread gripper members 256 apart to thereby release the electrical receptacle 224.

The overhead support receptacles 247 are secured in place relative to a predesigned opening in the ceiling portion of the interior mold structure 30. The overhead receptacles are secured by a gun assembly in substantially the same manner as the wall receptacles 224 as described herein above.

With the preassembled electrical utility package secured in place within the mold cavity portions, the preassembled environmental control package is located in a position above the interior mold structure 30. The supply conduits 203 extending from the combination of heating and air conditioning unit 201 are then extended outwardly to one of the room structures and are secured in place adjacent a predetermined openings 34 designed for the heating and air conditioning unit. The supply conduits 203 are secured in place by means of one of the gun assemblies 80 which are inserted through an insert plate 122 complementary to the predesigned openings in the mold and attached by conventional means, not shown, to the supply conduit.

The preassembled plumbing control unit 270 is lowered into position within the interior wall cavity portions and secured in place by conventional means, not shown.

After the utility components including electrical, environmental control and plumbing have been properly positioned adjacent the interior mold structure 30, the exterior door frame means are secured to the interior mold 30 adjacent an entrance opening 24, 25. The exterior door frame means 307 are secured to a flange 29 surrounding the exterior openings 24, 25 by means of a pair of gun assemblies 80. The gun assembly plunger portions 84 are inserted through openings 312, 313 provided in the door frame means and in the mold frame means, respectively. After the plunger 84 has been inserted through openings 312, 313, the latch elements 87 are operated to effect an engagement of the outer surface of the door frame leg members 308. After the latch members 87 have been moved into an extended latching position, the trigger means 105 is operated to withdraw plunger 84 outwardly to securely clamp the legs 308 of the door frame means between latch elements 87 and the door frame flange 29.

While the exterior door frame means 305 are being secured to the exterior or side wall mold structures 40, additional operators can position the interior door frame means 300 within the interior wall cavities 31 formed on the interior mold structure 30. The interior door frame means 300 are lowered from a position above interior cavities 31 into position surrounding the interior door frame openings 27 defined in the interior wall cavity, as shown in FIG. 22. After an interior door frame means 300 has been lowered into a position adjacent the interior door opening 27, the interior door frame means is firmly secured to the interior mold structure 30 by means of a pair of gun assemblies 80 in the same manner as described above for an exterior door 307.

After the interior and exterior door frame means 300, 307 have been secured in place and the outer mold construction 40 moved in position and secured to the inner mold structure 30, the window frame means 315 are added to the mold construction. The window frame means 315 are secured in place adjacent the predesigned window openings 32 by a pair of gun assemblies 80. The gun assembly plunger elements 84 are inserted through openings 322 provided in a window frame retainer plate 321. The gun assembly plunger elements 84 are then inserted through opening 324 of the window frame means and through openings 323 of the exterior wall mold construction 40. With the plunger elements inserted in place, the gun latch elements 89 are opeerated such that the latches are moved to a latching position on the exterior surface of the mold 40. Operation of the gun triggering mechanism 105 is then effected to withdraw the plunger 84 inwardly to securely clamp the window frame means 315 in position between retainer plate 321 and exterior wall mold construction 40, as shown in FIG. 12.

In assembling the above described environmental control, electrical, plumbing, window and door frame component means into position in the mold construction, a number of operators can perform a number of the assembling operations simultaneously to speed up the assembling operation.

With the exterior wall mold construction 40 secured to the inner mold construction 30 and with all of the utility components, window and door frame means, secured in place as described above, the roof mold structure 46 is then lowered into position by operation of the hoistering means 49. After the roof mold structure 46 is lowered into position adjacent the exterior wall structures 40, a number of clamp assemblies 60 are operated to securely clamp the roof mold structure to the exterior wall mold structure 40.

After the mold structures including interior mold 30, exterior wall mold 40 and roof mold 46 are securely clamped in position and with the material supply conduits 50 connected in flow communication with the roof mold 46, operation of the pressure pump means 51 is effected to supply an amount of synthetic material from the reservoir means 52 to the cavity portions defined by the mold construction. Operation of the pressure pump means 51 is continued until all of the cavity portions of the mold construction is completely filled with synthetic material. In the filling operation the air contained within the enclosed cavity portions is exhausted to produce a vacuum therein. The exhaustion of air from the cavity portions of the mold is effected by conventional means (not shown).

The mold construction filled with synthetic material is allowed to set up a sufficient amount of time whereby the synthetic material will be cured and will assume the form of the enclosed cavity portions which will be representative of the predesigned building construction.

After the building construction has been allowed to cure a predetermined amount of time as indicated above, the mold construction is disassembled by first removing all of the gun clamping assemblies which were used to secure the utility components, door and window frame means in position within the mold construction. The gun clamping assemblies 80 are removed by pulling the gun actuating rod 91 to cause the gun camming surfaces 92, 93 to effect movement of latching elements 87 to an inward retracted unlatched position, the gun plunger 84 can be withdrawn through the openings in which the plunger 84 was inserted for a clamping operation. With all of the gun clamping assemblies removed from the assembled mold construction, the clamp assemblies 60 are released and the roof mold structure 46 is elevated by means of the hoist mechanism 49. After the roof mold structure 46 has been moved to an elevated position, the exterior wall mold structures 40 are moved laterally from the assembled position, by means of the dolly and track means 44, 45, described herein above. With the exterior wall mold structures 40 moved laterally from the building construction, the building construction base plate element including exterior base plate portion 132 will be exposed. A conventional dolly mechanism (not shown) supported on the conventional track means 45 is then attached to the building construction base plate 132 for supporting the integrally formed building constructed of synthetic material. After the building construction is supported by the above described dolly and track means, the interior mold structure 30 is lowered to the first elevation 37 by operation of the hydraulic jack means 38.

The wall structures of the interior mold 30 converge inwardly whereby the interior mold structure 30 can be easily removed from the building construction without engaging any projecting edges of the interior wall around the window and door frame means or around the utility components. As indicated herein above, the utility components are assembled in a slightly spaced relationship relative to the exterior surface of the walls whereby the components will not present any sharp projecting edges which might become engaged with the interior mold structure 30 during a removal thereof. The upwardly and inwardly converging walls will allow the mold construction to be removed from the synthetic material walls without any frictional sliding relationship relative thereto.

After all of the mold constructions including interior mold 30, interior wall mold 40, and roof mold 46 have been removed, a building constructed as an integral unit of synthetic material will be exposed representative of a predesigned building defined by the mold structures. The integrally formed synthetic building is then transported away from the molding operation by the conventional dolly and track means.

The integrally formed building of synthetic material can be finished within the factory or can be finished on the building site, as desired. The exterior and interior walls of the building construction are finished by spraying with a protective coating. The exterior and interior wall coatings can be of various colors for decorative purposes.

A second part of the building and finishing operation includes the placement of the electrical control components including switches 238, supply means 245 and light fixtures 250 at the predetermined location within the wall and overhead receptacles 224, 247, respectively. The electrical control switch means 238, supply means 245 and light fixture means 250 are inserted within the plug-in socket means 237 whereby the control units will be in electrical contact with the electrical supply conduit 223. The above described electrical control units are secured in place by operation of either the screw elements 240 inserted through cover plates and into the retaining clips 242 provided in the wall receptacles 224 or by operation of the hook elements 251 relative to the shoulder portions 252 provided in the overhead receptacles 247.

After the integrally formed building of synthetic material has been finished by applications of the protective coatings and by application of the electrical control units, the building construction is ready for delivery to a building site. The integrally formed building of synthetic material constructed according to the present invention is sufficiently light which will allow the building to be transported to a building site by conventional airlift helicopter means.

After the building has been transported to a building site, the building is placed on a conventional preconstructed foundation means: the foundation means can be constructed of a number of various materials including synthetic material or wood foundation means. The synthetic building construction 10 of the present invention is secured in place relative to the foundation by connection of the building base plate means 130 to the foundation by connection of the building base plate means 130 to the foundation by conventional connecting means (not shown). With the building connected to the foundation, the electrical and plumbing control components are then connected to supply means which have been previously provided at the building site.

Another finishing operation is to position preconstructed cabinets and plumbing components within the building at predetermined locations. An additional finishing operation of the building would be to provide the door frame means 300, 307 and window frame means 315 with conventional doors and windows.

After the building construction has been completely connected with the electrical and plumbing supply means, the plumbing drainage means connected and the door and window means assembled in position, the building constructed according to the present invention is ready of occupancy.

It now becomes apparent that the above described illustrative embodiments of the method and apparatus of building construction is capable of obtaining the above stated objects and advantages. It is obvious that those skilled in the art may make modifications in the details of construction without departing from the spirit of the invention which is to be limited only by the scope of the appended claims.

What is claimed is:

1. A method of constructing a building, wherein the building is formed as an integral unit of synthetic material, comprising the steps of:

forming a mold unit according to a pre-determined design by positioning separate rigid, one-piece room units relative to one another so as to define a first set of cavities therebetween, said room units including tapered wall portions for facilitating easy removal of said building, and a first set of openings within said wall portions adjacent said cavities;

positioning door frame means within said first set of cavities adjacent said first set of openings within said wall portions, said door frame means including flange means which is provided with a series of openings;

positioning additional door frame means adjacent a second set of openings within exterior wall portions of said room units, said additional door frame means having flange means which is provided with a series of openings;

positioning window frame means adjacent a third set of openings within exterior wall portions of said room units, said window frame means having flange means which is provided with a series of openings;

positioning additional mold structures adjacent to said mold unit so as to form a second set of cavities between said structures and said unit, in which are disposed said additional door frame means and said window frame means;

filling said first and second set of cavities with a synthetic polyurethane foam building material such that said material respectively envelops said flange means, and respectively penetrates said openings within said flange means of said door frame means, said additional door frame means, and said window frame means, whereby said door frame means, said additional door frame means, and said window frame means will be securely anchored within said synthetic material when said material sets;

allowing said synthetic material to set; and removing said mold unit and said mold structures from said set synthetic material so as to expose a building which includes interior wall portions and interior door openings formed within said first set of cavities, and exterior wall portions, exterior door openings, window openings, and a roof portion formed within said second set of cavities.

* * * * *